US012510027B2

(12) United States Patent
Vitt et al.

(10) Patent No.: US 12,510,027 B2
(45) Date of Patent: Dec. 30, 2025

(54) GAS TURBINE ENGINES WITH HEAT RECOVERY SYSTEMS

(71) Applicants: General Electric Company; General Electric Deutschland Holding GmbH, Frankfurt (DE)

(72) Inventors: Paul Hadley Vitt, Evendale, OH (US); Michael Simonetti, West Chester, OH (US); Ashish Sharma, Garching (DE)

(73) Assignees: General Electric Company, Evendale, OH (US); General Electric Deutschland Holding GmbH, Frankfurt (DE)

( * ) Notice: Subject to any disclaimer, the term of this patent is extended or adjusted under 35 U.S.C. 154(b) by 0 days.

(21) Appl. No.: 18/524,874

(22) Filed: Nov. 30, 2023

(65) Prior Publication Data

US 2024/0093642 A1   Mar. 21, 2024

Related U.S. Application Data

(62) Division of application No. 17/211,345, filed on Mar. 24, 2021, now Pat. No. 11,867,121.

(51) Int. Cl.
*F02C 7/141* (2006.01)
*F01D 25/12* (2006.01)

(52) U.S. Cl.
CPC .............. *F02C 7/141* (2013.01); *F01D 25/12* (2013.01); *F05D 2230/60* (2013.01)

(58) Field of Classification Search
CPC ........ F01D 25/12; F01D 25/125; F01D 5/187; F01D 9/02; F01D 9/06; F01D 9/065;
(Continued)

(56) References Cited

U.S. PATENT DOCUMENTS 2,474,258 A  *  6/1949  Kroon ..................... F02C 7/047
                                                 244/134 B
4,989,406 A  *  2/1991  Vdoviak ............... F01D 25/162
                                                 415/209.1
(Continued)

FOREIGN PATENT DOCUMENTS

CN    106837555 A    6/2017
CN    106884723 A    6/2017
(Continued)

OTHER PUBLICATIONS

Chinese Office Action for Application No. 202210292931.8 dated Aug. 1, 2024 (16 pages with English Translation).

*Primary Examiner* — Nathaniel E Wiehe
*Assistant Examiner* — Rodolphe Andre Chabreyrie
(74) *Attorney, Agent, or Firm* — Dinsmore & Shohl LLP

(57) ABSTRACT

A gas turbine engine includes a fan located at a forward portion of the gas turbine engine, a compressor section and a turbine section arranged in serial flow order. The compressor section and the turbine section together define a core airflow path. A rotary member is rotatable with at least a portion of the compressor section and with at least a portion of the turbine section. An outlet guide vane assembly includes multiple outlet guide vanes located in an exhaust airflow path downstream of the turbine section. The multiple outlet guide vanes being spaced-apart circumferentially from each other over an angular range of about 360 degrees, and each multiple outlet guide vane defining a radial extent. At least one of the multiple outlet guide vanes includes a cold fluid passageway and another of the multiple guide vanes includes a heated fluid passageway.

18 Claims, 28 Drawing Sheets

(58) Field of Classification Search
CPC ...... F01D 9/00; F02C 7/12; F02C 7/14; F02C 7/141; F02C 7/16; F02C 7/224
See application file for complete search history.

(56) References Cited

U.S. PATENT DOCUMENTS

| | | | |
|---|---|---|---|
| 7,448,199 | B2 | 11/2008 | Johnson |
| 8,146,341 | B2 | 4/2012 | Siden et al. |
| 9,512,780 | B2 | 12/2016 | Bourassa et al. |
| 9,917,490 | B2 | 3/2018 | Lemmers et al. |
| 10,184,400 | B2 | 1/2019 | Cerny et al. |
| 10,267,191 | B2 | 4/2019 | Julien et al. |
| 12,065,936 | B2 * | 8/2024 | Lizzer .................. G01K 1/026 |
| 2007/0140845 | A1 * | 6/2007 | Marke .................. F01D 25/162 415/232 |
| 2012/0243970 | A1 | 9/2012 | Hellgren et al. |
| 2015/0098812 | A1 * | 4/2015 | Paradis ................ F01D 25/162 415/209.3 |
| 2015/0260103 | A1 * | 9/2015 | Yu ............................ F01D 5/30 60/797 |
| 2017/0022832 | A1 * | 1/2017 | Tsifourdaris .............. F01D 9/04 |
| 2017/0036773 | A1 | 2/2017 | Jones et al. |
| 2017/0130608 | A1 | 5/2017 | Wiebe et al. |
| 2017/0184024 | A1 | 6/2017 | Sennoun |
| 2018/0050806 | A1 | 2/2018 | Kupiszewski et al. |
| 2019/0153953 | A1 | 5/2019 | Niergarth et al. |
| 2019/0203620 | A1 | 7/2019 | Julien et al. |
| 2019/0203644 | A1 | 7/2019 | Niergarth et al. |
| 2019/0204010 | A1 | 7/2019 | Breeze-Stringfellow et al. |
| 2021/0324799 | A1 | 10/2021 | Suzuki et al. |

FOREIGN PATENT DOCUMENTS

| | | |
|---|---|---|
| CN | 110005529 A | 7/2019 |
| WO | 2020166342 A1 | 8/2020 |

* cited by examiner

GAS TURBINE ENGINES WITH HEAT RECOVERY SYSTEMS

CROSS-REFERENCE TO RELATED APPLICATION

The present specification is a divisional of U.S. patent application Ser. No. 17/211,345 filed Mar. 24, 2021 and entitled "Gas Turbine Engines with Heat Recovery Systems," the entirety of which is incorporated by reference herein.

FIELD

The present specification generally relates to gas turbine engines and, more specifically, to gas turbine engines that include heat recovery systems.

TECHNICAL BACKGROUND

Gas turbine engines are frequently used as part of aircraft propulsion systems. Gas turbine engines may include a compressor section, a combustion section, a turbine section and an exhaust section. Air is provided by a fan to the compressor section where the air is compressed and delivered to the combustion section. In the combustion section, the air is mixed with fuel and then burned. The combustion gases are then delivered to the turbine section, which drives the turbine section before delivering the combustion gases to the exhaust section.

During operation, temperatures within the gas turbine engines may be elevated. In order to manage the increases in temperature of the gas turbine engines, various cooling systems may be provided that are used to remove thermal energy from various components of the gas turbine engines. This heat may be used by other engine systems in a beneficial way.

SUMMARY

According to an embodiment of the present disclosure, a gas turbine engine includes a fan located at a forward portion of the gas turbine engine, a compressor section and a turbine section arranged in serial flow order. The compressor section and the turbine section together define a core airflow path. A rotary member is rotatable with at least a portion of the compressor section and with at least a portion of the turbine section. An outlet guide vane assembly includes multiple outlet guide vanes located in an exhaust airflow path downstream of the turbine section. The multiple outlet guide vanes being spaced-apart circumferentially from each other over an angular range of about 360 degrees, and each multiple outlet guide vane defining a radial extent. At least one of the multiple outlet guide vanes includes a cold fluid passageway extending at least partially radially therethrough through which a fluid coolant flows and another of the multiple guide vanes includes a heated fluid passageway extending at least partially radially therethrough through which the fluid coolant flows and receives heat from exhaust airflow from the core airflow path. A "fluid" is intended to mean a liquid or gas, or a substance that exhibits properties of both a gas and a liquid (i.e., supercritical fluid).

According to another embodiment of the present disclosure, a method includes removably attaching an outlet guide vane assembly to a turbine rear frame of a gas turbine engine. The outlet guide vane assembly includes multiple outlet guide vanes located in an exhaust airflow path downstream of the turbine section. The multiple outlet guide vanes being spaced-apart circumferentially from each other over an angular range of about 360 degrees, and each multiple outlet guide vane defining a radial extent. At least one of the multiple outlet guide vanes includes a cold fluid passageway extending at least partially radially therethrough through which a fluid coolant flows and another of the multiple guide vanes comprises a heated fluid passageway extending at least partially radially therethrough through which the fluid coolant flows and receives heat from exhaust airflow from a core airflow path. The fluid coolant is delivered through the cold fluid passageway and then the heated fluid passageway. The fluid coolant receives heat from exhaust airflow from the core airflow path as the fluid coolant is directed through the heated fluid passageway.

According to another embodiment of the present disclosure, a gas turbine engine includes a compressor section and a turbine section arranged in serial flow order. The compressor section and the turbine section together define a core airflow path. A rotary member is rotatable with at least a portion of the compressor section and with at least a portion of the turbine section. A turbine rear frame includes first outlet guide vanes located in an exhaust airflow path downstream of the turbine section. The first outlet guide vanes being spaced-apart circumferentially from each other over an angular range of about 360 degrees, and each first outlet guide vane defining a radial extent. An outlet guide vane assembly includes second outlet guide vanes located in the exhaust airflow path adjacent the first outlet guide vanes. The second outlet guide vanes are spaced-apart circumferentially from each other over an angular range of about 360 degrees, and each second outlet guide vane defining a radial extent. One or both of the first outlet guide vanes and the second outlet guide vanes is turning thereby altering a flow direction of exhaust airflow from the exhaust airflow path.

According to another embodiment of the present disclosure, a gas turbine engine includes a fan located at a forward portion of the gas turbine engine, a compressor section and a turbine section arranged in serial flow order. The compressor section and the turbine section together define a core airflow path. A rotary member is rotatable with at least a portion of the compressor section and with at least a portion of the turbine section. An outlet guide vane assembly includes multiple outlet guide vanes located in an exhaust airflow path downstream of the turbine section. The multiple outlet guide vanes being spaced-apart circumferentially from each other over an angular range of about 360 degrees, and each multiple outlet guide vane defining a radial extent. One or more outlet guide vane includes a surface enhancement feature that increases a surface area of a side surface of the outlet guide vane.

Additional features, embodiments and advantages of the gas turbine engines and methods of their use described herein will be set forth in the detailed description which follows, and in part will be readily apparent to those skilled in the art that such features, embodiments and advantages are contemplated and considered within the scope of the disclosure, based on the teachings disclosed hereupon.

It is to be understood that both the foregoing general description and the following detailed description describe various embodiments and are intended to provide an overview or framework for understanding the nature and character of the subject matter described and claimed herein. The accompanying drawings are included to provide a further understanding of the various embodiments, and are incorporated into and constitute a part of this specification. The drawings illustrate the various embodiments described herein, and together with the description serve to explain the principles and operations of the subject matter described and claimed herein.

DETAILED DESCRIPTION

Embodiments described herein are generally directed to gas turbine engines that include heat recovery systems. The gas turbine engines may include a compressor section and a turbine section arranged in serial flow order and together defining a core airflow path that leads to an exhaust airflow path out of the engine. A rotary member, such as a shaft, spool, etc., is rotatable with at least portions of the compressor section and turbine section. An electrical machine may be embedded within the gas turbine engines. The electrical machine may be rotatable with the rotary member and positioned coaxially with the rotary member at least partially inward of the core airflow path along a radial direction of the gas turbine engines. The electrical machine may be an electric generator that is driven by the rotary member.

The gas turbine engines include a heat recovery system that collects heat from one or more locations using a fluid that is at a cooler temperature, such as a thermal transport fluid. As examples, the heat recovery system may collect heat from the exhaust airflow path and/or the electrical machine. The heat recovery system may be integrated into existing structural components of the gas turbine engines, such as outlet guide vanes, that are formed to be suitable structures to carry heat exchange passageways therethrough and achieve heat recovery.

Figure 1:
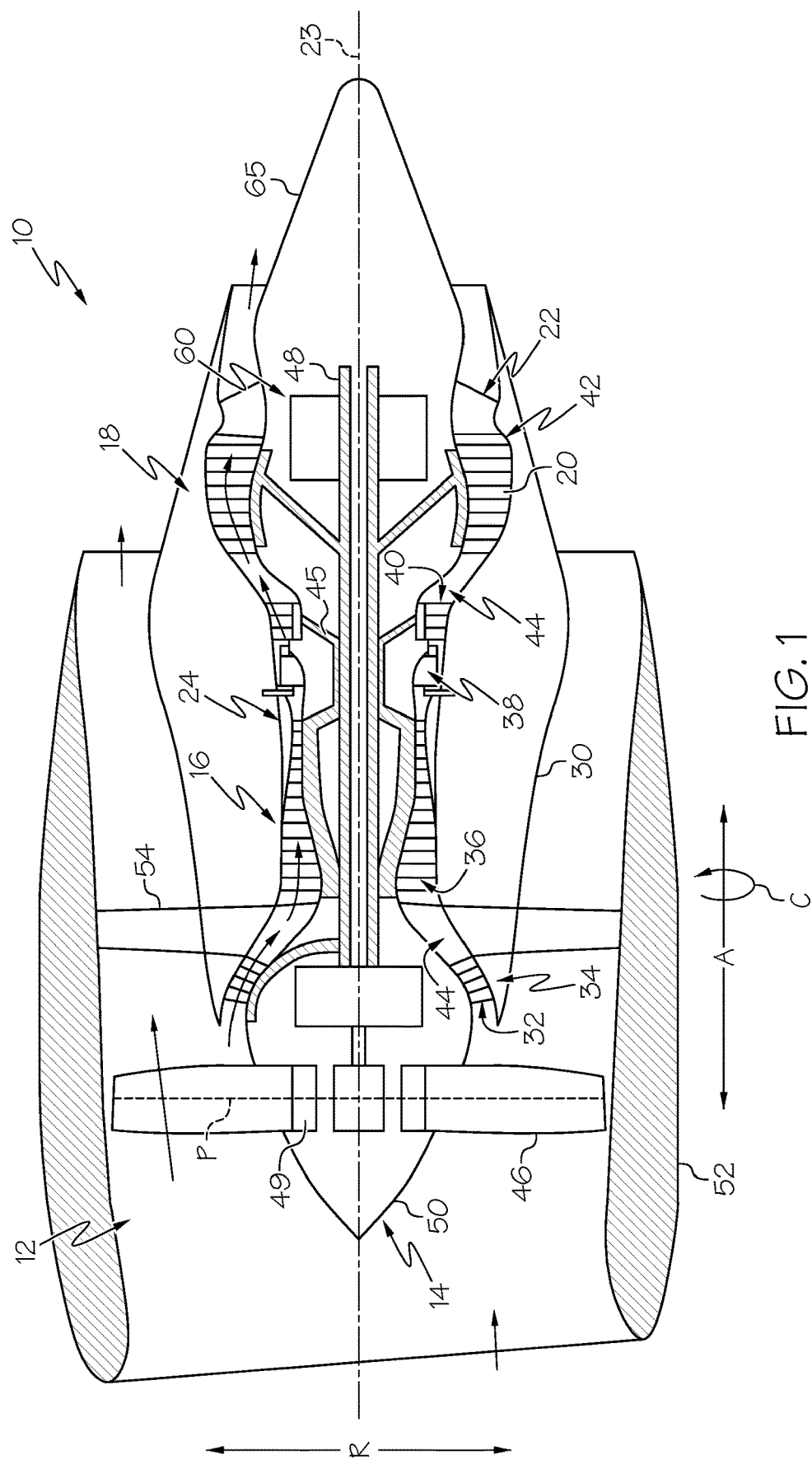
FIG. 1 is a schematic section view of a gas turbine engine including an electrical machine, according to one or more embodiments shown and described herein.

Referring to FIG. 1, an exemplary gas turbine engine 10 may be configured for wing or fuselage mounting on an aircraft. In some embodiments, the gas turbine engine 10 may also be used to provide power. The gas turbine engine 10 includes a fan section 12 including a fan 14, a compressor section 16 and a turbine section 18. The fan section 12, compressor section 16 and turbine section 18 may include one or more rotor disks 20 that include rotor blades extending radially therefrom. Air is drawn into the gas turbine engine 10 and accelerated by the fan 14. The air, or at least a portion thereof, is compressed in the compressor section 16 and is delivered to a combustion chamber where the air is mixed with fuel and combusted thereby generating hot combustion gases. The combustion gases pass through a turbine section 18, which extracts mechanical work from the combustion gases to cause the attached compressor section 16 to turn and thereby further compress the upstream air to produce a self-sustaining process. The combustion gas is exhausted through a nozzle section 22.

The gas turbine engine 10 defines an axial direction A that extends parallel to a longitudinal centerline 23, a radial direction R that extends perpendicular to the axial direction A, and a circumferential direction C that extends about the axial direction A. The gas turbine engine 10 includes the fan section 12 and a core section 24 that is located downstream of the fan section 12 in the axial direction.

The gas turbine engine 10 includes a tubular core cowl 30 that defines, at least in part, an annular inlet 32. The core cowl 30 encases, in serial flow relationship, the compressor section 16 including a booster or low pressure (LP) compressor 34 and a high pressure (HP) compressor 36, a combustion section 38 that includes the combustion chamber, the turbine section 18 including a high pressure (HP) turbine 40 and a low pressure (LP) turbine 42, and the jet exhaust nozzle section 22. The compressor section 16, combustion section 38, and turbine section 18 together define a core airflow path 44 extending from the annular inlet 32 through the LP compressor 34, HP compressor 36, combustion section 38, and HP turbine 40. A first shaft or spool 45 drivingly connects the HP turbine 40 to the HP compressor 36. A second shaft or spool 48 drivingly connects the LP turbine 42 to the LP compressor 34 and the fan 14.

The fan section 12 includes the fan 14 having a plurality of fan blades 46 coupled to a disk 49 in a spaced apart manner. The fan blades 46 extend outward from disk 49 generally along the radial direction R. The disk 49 is covered by rotatable front hub 50 that is aerodynamically contoured to promote an air flow through the plurality of fan blades 46. The exemplary fan section 12 includes an annular fan casing or outer nacelle 52 that circumferentially surrounds the fan 14 and/or at least a portion of the core section 24. The outer nacelle 52 is supported relative to the core section 24 by a plurality of circumferentially-spaced struts that also serve as outlet guide vanes 54. A downstream section 56 of the outer nacelle 52 extends over an outer portion of the core cowl 30 to define a bypass airflow passage 58 therebetween.

The gas turbine engine 10 includes an electrical machine 60 that is rotatable with the fan 14 and is located within a tail cone 65. The electrical machine 60 is an electric generator co-axially mounted to and rotatable with the second shaft 48. In other embodiments, an axis of the electrical machine 60 may be offset radially from the axis of the second shaft 48 and further may be oblique to the axis of the second shaft 48, such that the electrical machine 60 may be positioned at any suitable location at least partially inward of the core airflow path 44. In some embodiments, the electrical machine 60 may be rotatable with the first shaft 45.

The gas turbine engine 10 depicted in FIG. 1 is provided by way of example only. In other exemplary embodiments the gas turbine engine 10 may be replaced with other types of gas turbine engines utilizing an embedded electrical machine without loss of clarity. Examples include a turboprop engine, a turbojet engine, an open rotor, or inducted fan engine.

Figure 2:
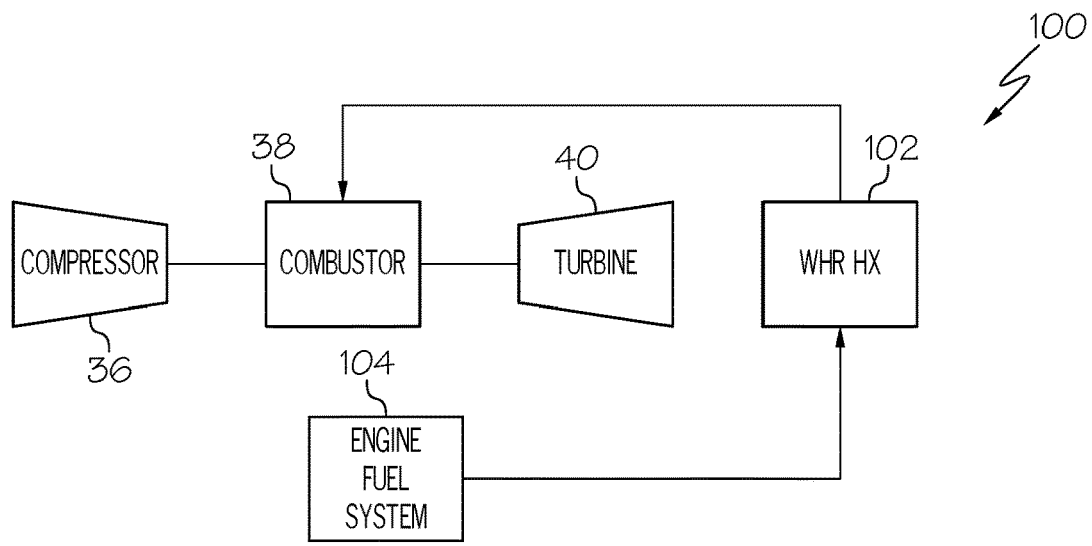
FIG. 2 is a diagrammatic view of a heat recovery system for use in the gas turbine engine of FIG. 1, according to one or more embodiments shown and described herein.
Figure 3:
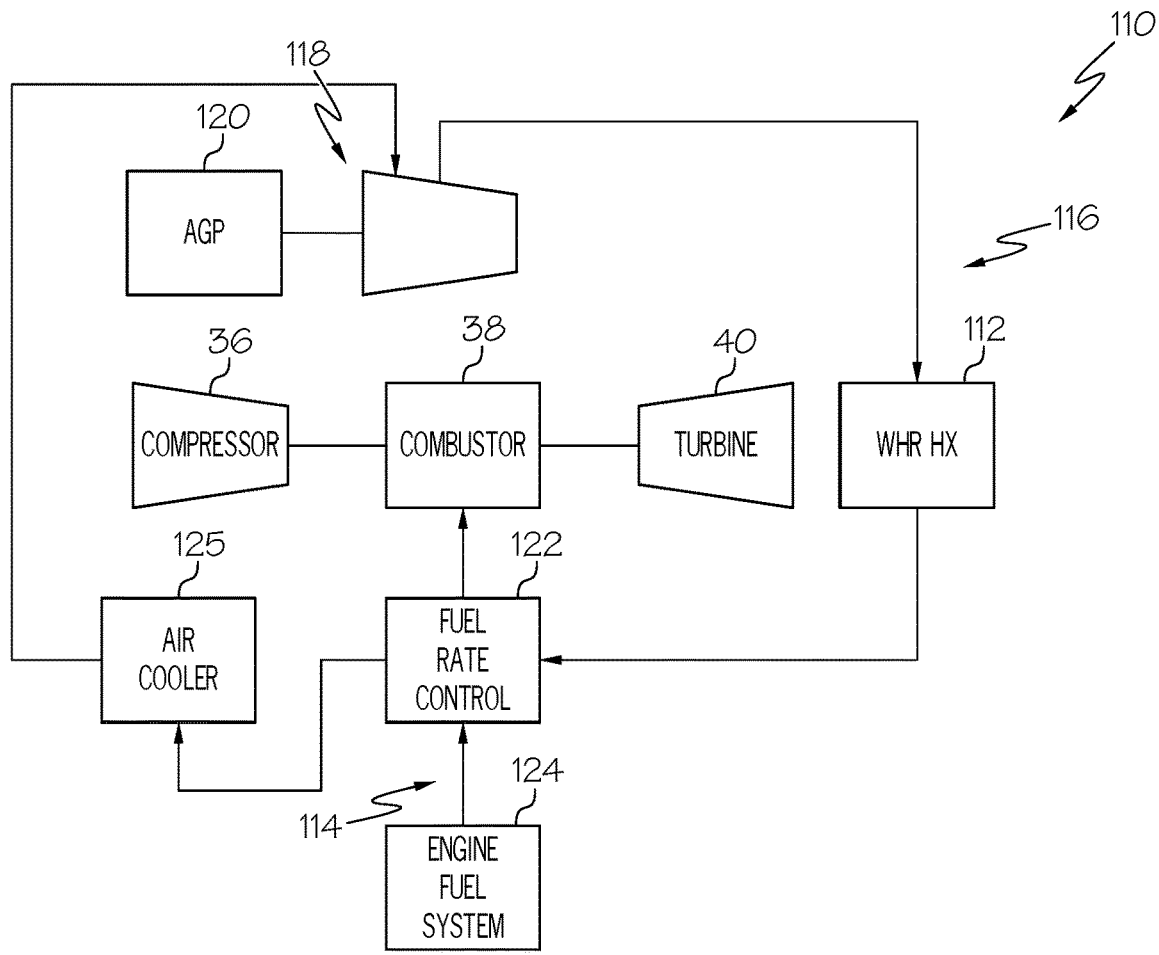
FIG. 3 is a diagrammatic view of another embodiment of a heat recovery system for use in the gas turbine engine of FIG. 1, according to one or more embodiments shown and described herein.

Referring to FIGS. 2 and 3, diagrammatic heat recovery systems are illustrated where heat is captured and used in different manners. Referring first to FIG. 2, the heat recovery system 100 may include a waste heat recovery heat exchanger 102 that is a heat source heat exchanger for capturing heat for a particular area or component of the gas turbine engine 10. As will be described in greater detail below, the waste heat recovery heat exchanger 102 may be formed by outlet guide vanes. In this example, the waste heat recovery heat exchanger 102 is directly integrated with a fuel delivery system 104 of the gas turbine engine 10. The fuel delivery system 104 provides fuel to the combustion section 38 that is located between the HP compressor 36 and HP turbine 40. The fuel is delivered from the fuel delivery system 104, through the waste heat recovery heat exchanger 102 for pre-heating the fuel and then delivered to the combustion section 38. Because the fuel is combusted in the combustion section 38, pre-heating the fuel using the waste heat recovery heat exchanger 102 can improve the efficiency of the combustion process.

Referring to FIG. 3, another example of a heat recovery system 110 including a waste heat recovery heat exchanger 112 that is integrated into a fuel delivery system 114 indirectly through a thermal transport bus 116 is shown. The thermal transport bus 116 includes a heat exchange fluid flowing therethrough. A pump 118 is provided in the thermal transport bus 116 for generating a flow of the heat exchange fluid through the thermal transport bus 116. The pump 118 may be a rotary pump including an impeller, or may be any other suitable pump. The pump 118 may be powered by an electric motor, or be in mechanical communication with and powered by one of the shafts 45 and 48 via an accessory gearbox 120.

A fuel flow rate control 122 may include any number of pumps and nozzles for controlling delivery of fuel to the combustion section 38. In FIG. 3, the fuel flow rate control 122 is shown separately from fuel system 124 because the fuel flow rate control 122 is used to deliver heat to the fuel (e.g., via a heat sink heat exchanger) rather than directly through the waste heat recovery heat exchanger 112 as in FIG. 2. The heated fuel is then provided to the combustion section 38. A heat sink heat exchanger 125 may be used to cool the heat exchange fluid upstream of the pump 118.

Figure 4:
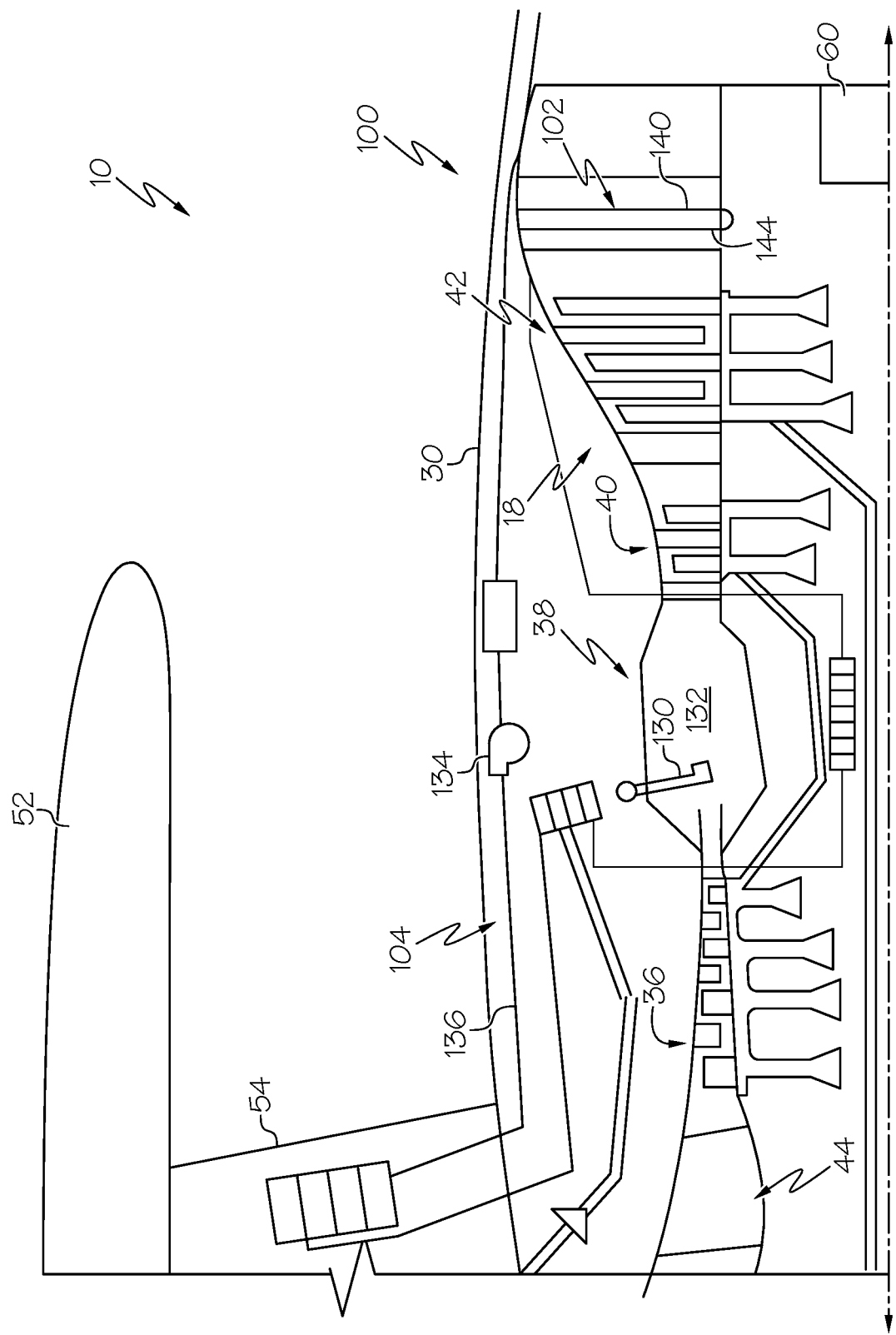
FIG. 4 is a schematic section view of the gas turbine engine of FIG. 1, according to one or more embodiments shown and described herein.

Referring to FIG. 4, a more detailed, cross-section view of the gas turbine engine 10 including heat recovery system 100 is illustrated. The exemplary gas turbine engine 10 includes the core cowl 30 that encases the compressor section 16 including the LP compressor 34 (FIG. 1) and the HP compressor 36, the combustion section 38 and the turbine section 18 including the HP turbine 40 and the LP turbine 42. The outer nacelle 52 defines the bypass airflow passage 58 with the core cowl 30. The outlet guide vane 54 supports the outer nacelle 52 relative to the core cowl 30.

The compressor section 16, the combustion section 38 and the turbine section 18 together define at least part of the core airflow path 44. The fuel delivery system 104 provides a fuel flow to the combustion section 38. The exemplary fuel delivery system 104 may generally include one or more fuel nozzles 130 that are configured to provide a mixture of fuel and air to the combustion chamber 132, as well as a fuel pump 134 and fuel lines 136. The fuel pump 134 may provide fuel flow through the fuel lines 136 from a fuel source to the fuel nozzles 130.

As used herein, the terms "heat source" and "heat sink" describe a heat exchange relationship relative to the heat recovery system depending on whether the heat exchange relationship is providing heat to the heat recovery system or removing heat from the heat recovery system, respectively. For example, a heat source heat exchange relationship refers to a heat exchange relationship where heat is provided to the heat recovery system through thermal communication between the heat recovery system and a heat source. As used herein, the term "thermal communication" refers to two or more systems being in relatively close proximity to each other to enable an effective heat transfer between the systems, e.g., a heated fluid contained within a non-insulated pipe submerged in a cold fluid. A heat sink heat exchange relationship refers to a heat exchange relationship where heat is removed from the heat recovery system.

Figure 5:
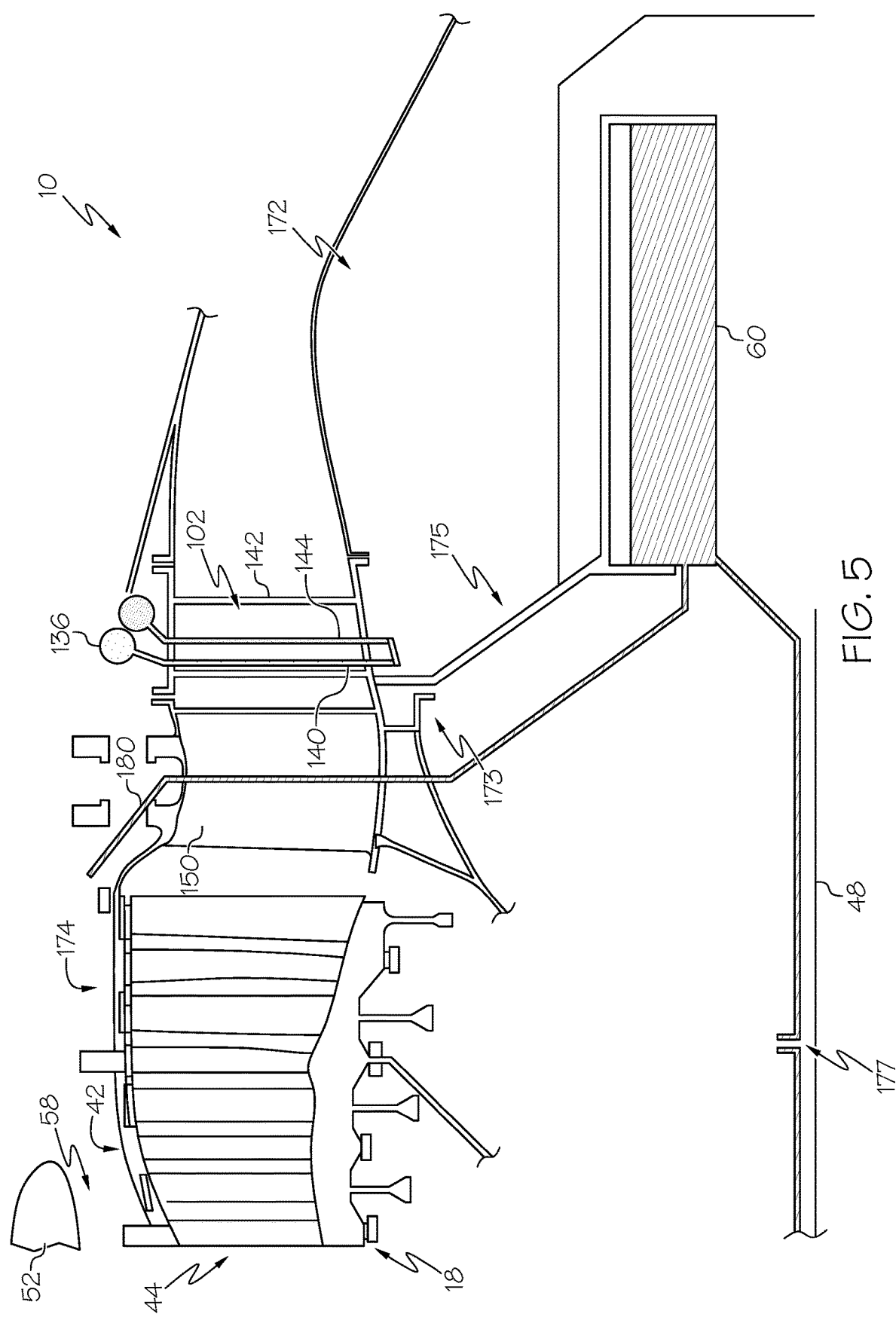
FIG. 5 is a more detailed, schematic section view of the gas turbine engine of FIG. 1, according to one or more embodiments shown and described herein.

Referring also to FIG. 5, the waste heat recovery heat exchanger 102 is in a heat source heat exchange relationship with the fuel of the fuel delivery system 104. As can be seen, the fuel line 136 extends to a fuel passageway 140 that is formed within an outlet guide vane 142 at a downstream end of the LP turbine 42. In some embodiments, a cold fuel passageway 140 may be provided through one of the outlet guide vanes 142 and a heated fuel passageway 144 may be provided through an adjacent outlet guide vane that receives fuel from the cold fuel passageway 140.

Figure 6:
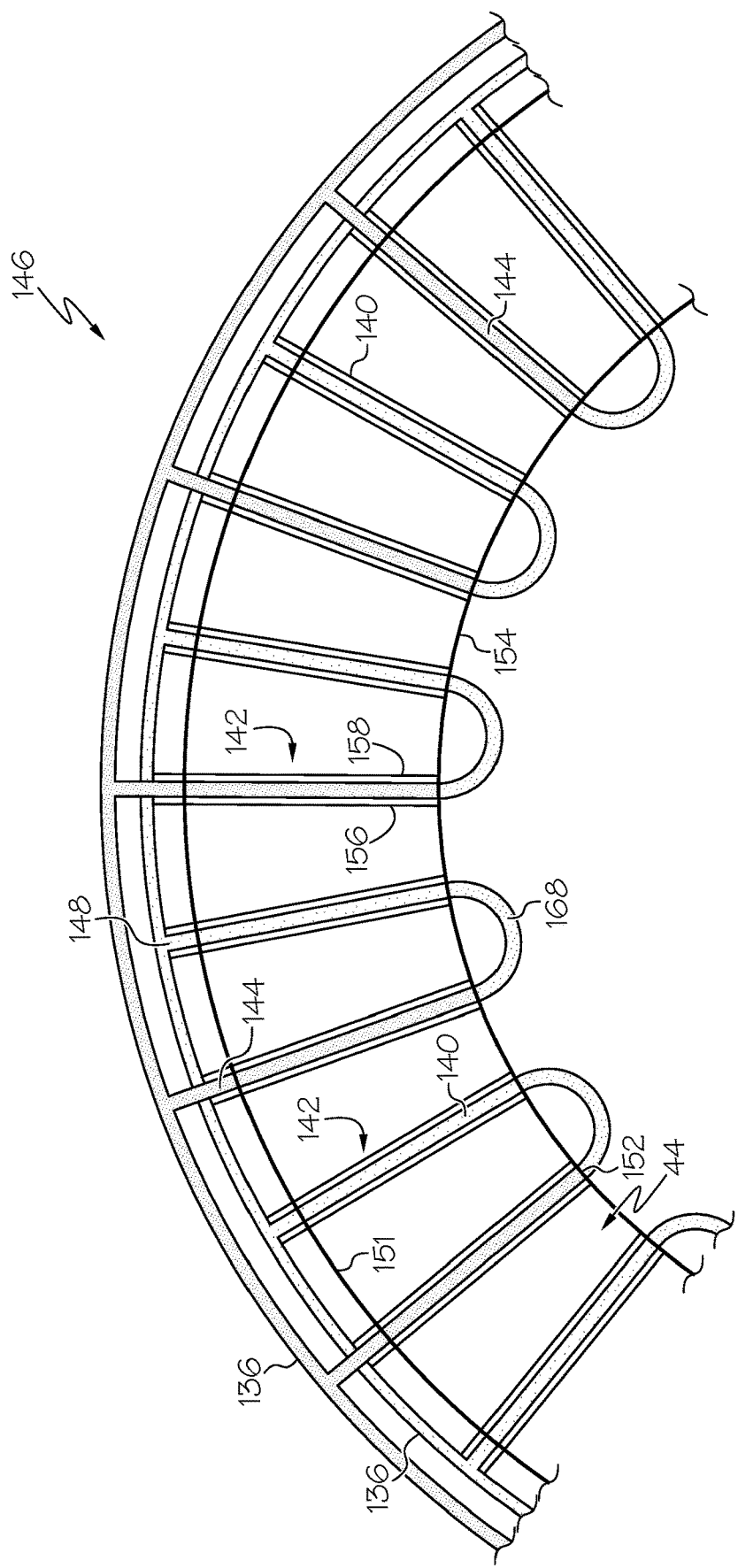
FIG. 6 is a schematic section view of an outlet guide vane assembly for use in the gas turbine engine of FIG. 5, according to one or more embodiments shown and described herein.

As an example, FIG. 6 diagrammatically illustrates an outlet guide vane assembly 146 that may or may not be a structural part of a turbine rear frame 150 (FIG. 5). The outlet guide vane assembly 146 includes a plurality of the outlet guide vanes 142 that are spaced-apart from one another in the circumferential direction within the core airflow path 44. Each outlet guide vane 142 of at least a plurality of the outlet guide vanes 142 includes either a heated fuel passageway 144 or a cold fuel passageway 140. It should be noted that the terms "heated" and "cold" are relative to maximum fuel temperatures within the passageways 140 and 144 as, for example, fuel in the cold fuel passageway 140 may be heated, but not heated to a temperature that is higher than a maximum fuel temperature in the heated fuel passageway 144. In some embodiments, the cold fuel passageway 140 may be insulated to reduce heat transfer to fuel in the cold fuel passageway 140. Further, the fuel passageways 140 and 144 are illustrated as being straight in the radial direction; however, the fuel passageways 140 and 144 may follow any suitable path, such as serpentine, wave-forms or even irregular passageways depending, at least in part, on the type of engine, the shape of the guide vanes, desired amount of heat exchange, etc.

Figure 7:
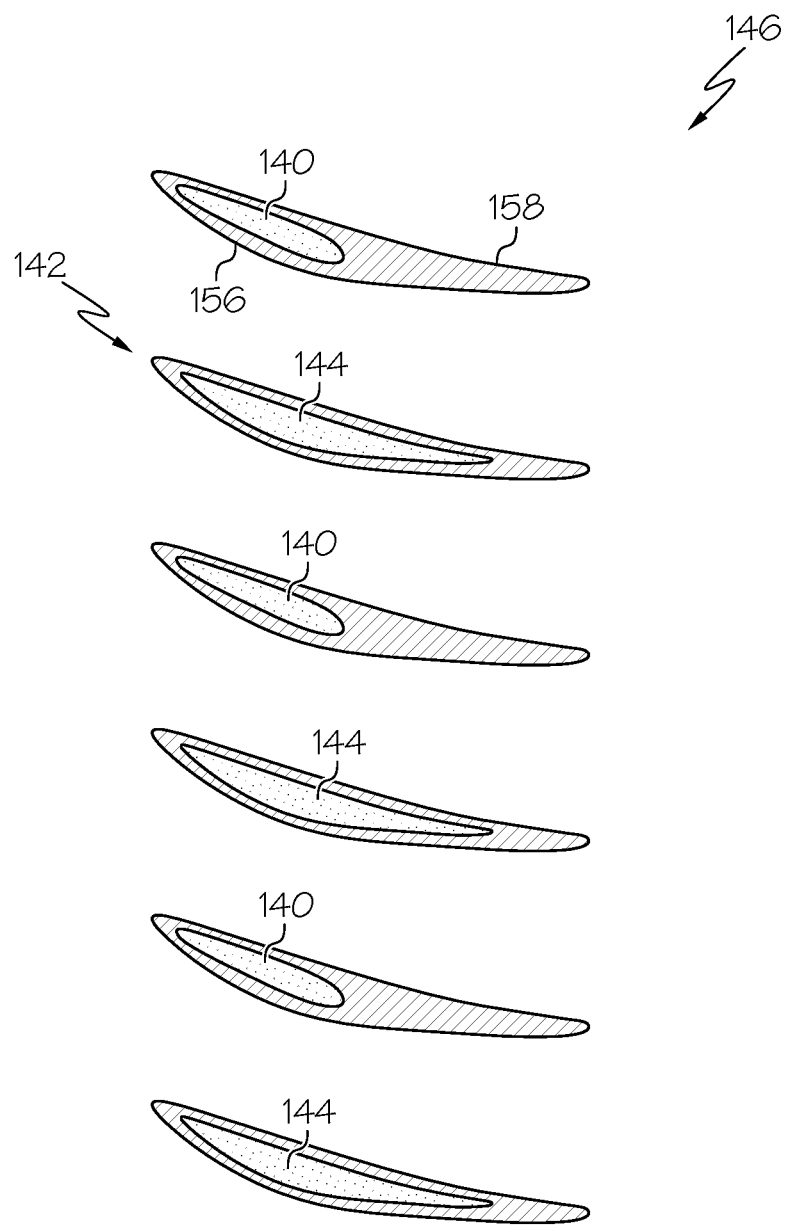
FIG. 7 is a schematic section view of the outlet guide vane assembly of FIG. 5, according to one or more embodiments shown and described herein.

Each outlet guide vane 142 includes an outer end 148 located at an outer guide vane support 151, an inner end 152 located at an inner guide vane support 154 and opposite sides 156 and 158. Referring briefly to FIG. 7, the sides 156 and 158 may together form the shape of a fin that may have multiple functions, one being to transfer heat from the core airflow path 44 and then to transfer heat to the fuel in the heated fuel passageway 144. Another function may be to guide the airflow as the airflow exits the gas turbine engine 10. In some embodiments, the shapes of the outlet guide vanes 142 may be non-turning or low-turning that are aligned with the turbine airflow exit angle thereby having little influence on airflow direction. In some embodiments, the shape of the outlet guide vanes 142 may be suitable to change or turn the turbine airflow exit angle. In this regard, these outlet guide vanes 142 may be considered turning outlet guide vanes 142. Whether turning or non-turning, the outlet guide vanes 142 may be sized, shaped and configured to transfer heat from the heated air passing by the outlet guide vanes 142 through the core airflow path 44 to fuel in the fuel passageways 140 and 144 in order to pre-heat the fuel.

Figure 8:
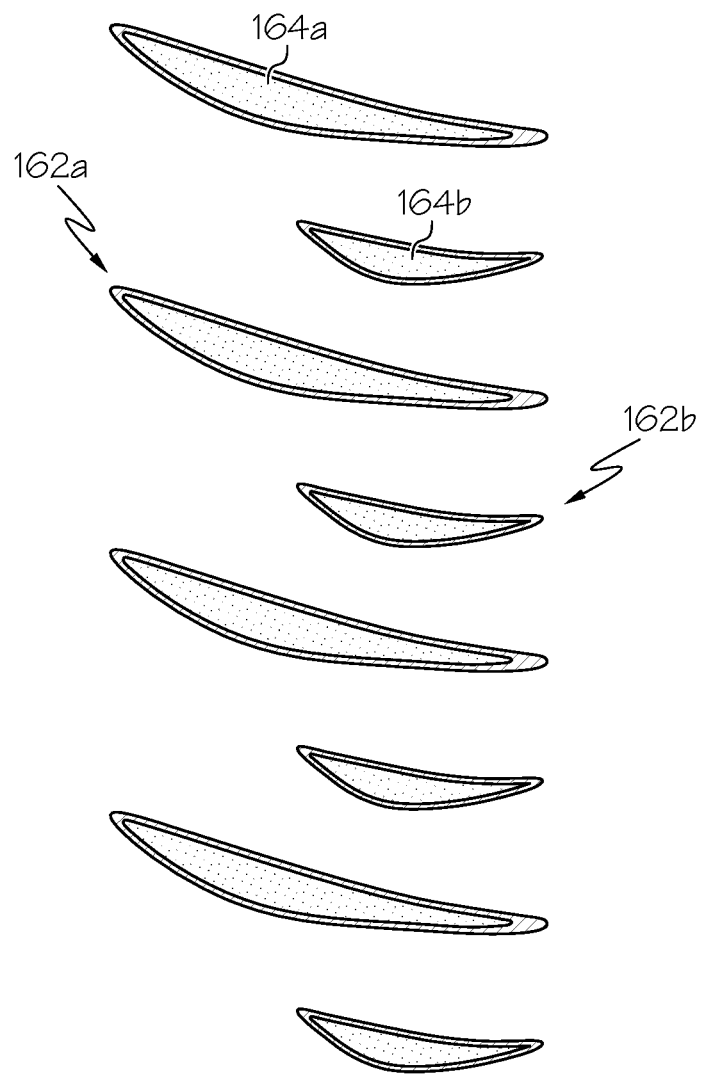
FIG. 8 is a schematic section view of another embodiment of an outlet guide vane assembly, according to one or more embodiments shown and described herein.

In FIG. 7, the outlet guide vanes 142 are all of about the same length in the axial A direction, which can have a greater effect on the airflow direction between the outlet guide vanes 142. Referring to FIG. 8, another embodiment of outlet guide vanes 162 is illustrated where adjacent outlet guide vanes 162a and 162b are of different lengths, which can have a greater effect on heat exchange effectiveness. In this example, the outlet guide vanes 162a are of relatively longer length and the outlet guide vanes 162b are of relatively shorter length and the outlet guide vanes 162a. The shorter length of the outlet guide vanes 162b can reduce an amount of area of the shorter length guide vanes 162b exposed to the adjacent outlet guide vanes 162a that can have an impact on fuel temperature in cold fuel passageway 164a. The shorter length of the outlet guide vanes 162b can also reduce an amount of material or distance between the heated fuel passageway 164b and the surrounding heated air compared to cold fuel passageway 164a. In some embodiments, the cold fuel passageways 164a may be insulated.

Referring again to FIG. 6, the cold fuel passageways 140 may be fluidly coupled to the fuel line 136 of the fuel delivery system 104 (FIG. 4) at the outer end 148. In this regard, relatively cold fuel is provided to the cold fuel passageways 140. Each cold fuel passageway 140 may be fluidly connected to a heated fuel passageway 144 by a connecting conduit 168. The connecting conduit 168 may be any suitable structure that fluidly connects the fuel passageways 140 and 144. In some embodiments, the connecting conduit 168 may also be formed of a material that is suitable for transferring heat from the heated air to the fuel as the fuel enters the heated fuel passageway 144. The heated fuel passageways 144 may be coupled to the fuel line 136 of the fuel delivery system 104 (FIG. 4) at the outer end 148. In this regard, heated fuel is provided to the combustion section 38.

As can be appreciated, the heat exchange relationship between the outlet guide vanes 142 may be referred to as a heat source heat exchange relationship as heat is being provided to the fuel as the fuel travels along the cold and heated fuel passageways 140 and 144. The heat source heat exchange relationship is being provided by the outlet guide vanes 142 themselves, as opposed to a separately formed heat exchanger, with their integrated fuel passageways 140 and 144 extending therethrough. In some embodiments, the fuel passageways 140 and 144 may be formed as an integral and monolithic part of the outlet guide vanes 142. For example, three-dimensional printing may be used to form the outlet guide vanes 142 and their associated fuel passageways 140 and 144. Rather than fuel, a thermal transfer fluid may pass through the passageways for transferring heat to the fuel system as discussed and shown with reference to FIG. 3.

Referring again to FIG. 5, the gas turbine engine 10 may include the electrical machine 60. The electrical machine 60 is disposed in an aft portion 172 of the gas turbine engine 10 and may be releasably mounted to the turbine rear frame 150 using a rear flange coupling 173 of the turbine rear frame 150 and a support structure 175 of the electrical machine 60. The electrical machine 60 may also be releasably connected to the LP shaft 48 at a shaft coupling 177. The aft portion 172 is disposed axially downstream the core section 174 of the gas turbine engine 10.

The electrical machine 60 may be or include an electric generator that converts mechanical energy (e.g., generated from exhaust gases generated in the core section 174) produced by the gas turbine engine 10 into electrical energy that may be used to power electrical devices of the gas turbine engine 10 or components disposed elsewhere on an aircraft incorporating the gas turbine engine 10. Positioning the electrical machine 60 in the aft portion 172 of the gas turbine engine 10 can render the electrical machine 60 accessible for maintenance, repair, and replacement and can facilitate removal of the electrical machine 60 if needed. The electrical machine 60 may be integrated into the gas turbine engine 10 via the releasable couplings 173 and 177 that may be removed without invasively disassembling the entirety of the gas turbine engine 10, such as without removing the gas turbine engine 10 from a wing of an aircraft.

Positioning the electrical machine 60 in the aft portion 172 provides accessibility, but can create additional design considerations for the gas turbine engine 10. Exhaust gases generated via the core section 174 can be at relatively high temperatures (e.g., in excess of approximately 700° C. or more in various embodiments), which renders cooling the electrical machine 60 beneficial. Additionally, the aft portion 172 of the gas turbine engine 10 may not be directly connected to an aircraft incorporating the gas turbine engine 10 (e.g., the gas turbine engine 10 may be connected to a wing of an aircraft via a pylon extending from the outer nacelle 52 (FIG. 1) disposed radially outward from the core section 174. Given this, to provide the electrical power generated via the electrical machine 60 to other portions of the aircraft, the electrical power is routed through the gas turbine engine 10.

In view of the foregoing, generator services 180 may be routed through the turbine rear frame 150. The generator services 180 may include a lubrication conduit and a plurality of electrical connectors (e.g., power cables) that conductively connect the electrical machine 60 to a converter. The lubrication conduit may carry a lubricant, such as oil to the electrical machine 60. The oil may be used as part of the cooling system and used to cool the electrical machine and then be carried away, for example, back through the generator services 180.

The electrical connectors connect the electrical machine 60 to the converter. For example, the electrical machine 60 may generate an alternating current ("AC") power signal from mechanical energy in the spinning LP shaft 48, which electrical power is routed to the converter (located in the forward part of the engine) via the generator services 180. The converter may generate a DC voltage from the AC power signal for communication to alternative locations on the aircraft (e.g., via an electrical communications bus). The generator services 180 may include a plurality of sets of electrical connectors, with each set of electrical connectors including a number of electrical connectors that correspond to the number of phases in the AC power signal generated via the electrical machine 60. The number of sets of electrical connectors of the generator services 180 may vary depending on the implementation. Incorporating a number of different sets of electrical connectors in the generator services 180 can provide electrical connection redundancies that facilitate provision of the AC power signal to the converter even if one of the sets of the electrical connectors fails during operation.

Figure 9:
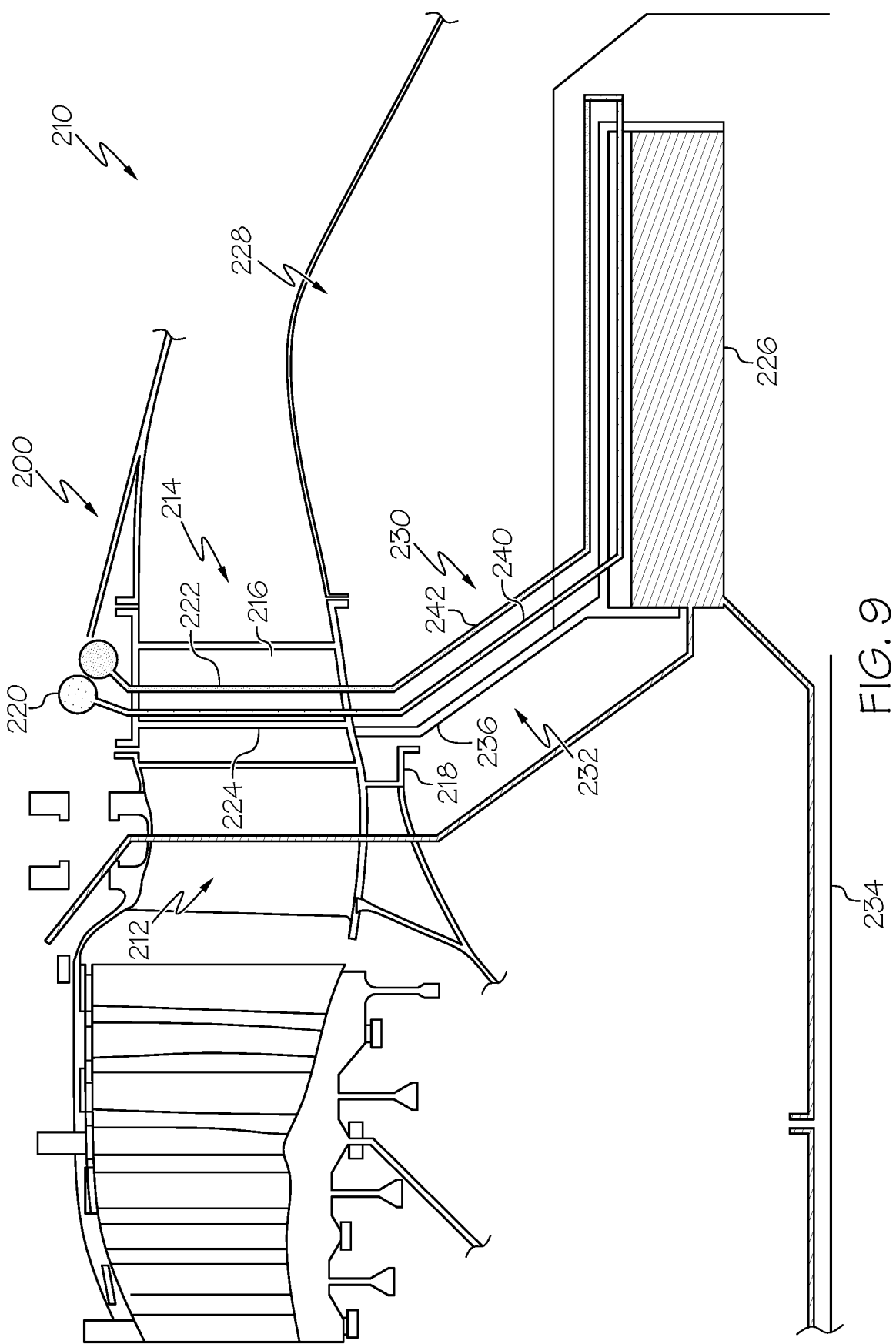
FIG. 9 is a schematic section view of another embodiment of a gas turbine engine, according to one or more embodiments shown and described herein.

Referring to FIG. 9, another embodiment of a heat recovery system 200 may be incorporated into a gas turbine engine 210 that is similar to the gas turbine engine 10 of FIG. 5. The gas turbine engine 210 includes a turbine rear frame 212 and an outlet guide vane assembly 214 that includes a plurality of outlet guide vanes 216. The outlet guide vane assembly 214 may be releasably coupled to the turbine rear frame 212 using a rear flange coupling 218 as above with FIG. 5, or the outlet guide vane assembly 214 may be coupled directly to the turbine rear frame 212 and be a structural, load bearing part of the turbine rear frame 212.

The heat recovery system 200 includes a thermal transport bus 220 that includes a thermal transport fluid that is configured to flow therethrough. The outlet guide vanes 216 include either a heated fluid passageway 222 or a cold fluid passageway 224 that are fluidly connected to the thermal transport bus 220 such that the thermal transport fluid flows therethrough.

In this embodiment, the heat recovery system 200 may also be part of a cooling system that is used to cool an electrical machine 226 that is located in aft portion 228 of the gas turbine engine 210. As can be seen, the thermal transport bus 220 extends radially toward and away from the electrical machine 226. The electrical machine 226 may be part of an electrical machine assembly 230 that also includes a support structure 232 that connects the electrical machine 226 to both the turbine rear frame 212 and an LP shaft 234. The support structure 232, for example, may include an outer segment 236 that connects a stator of the electrical machine to the fixed turbine rear frame 212 and an inner segment 238 that connects a rotor to the LP shaft 234 that rotates the rotor relative to the stator.

The thermal transport bus 220 may extend alongside and be mounted to the support structure 232 with a cold portion 240 of the thermal transport bus 220 passing through at least portions of the support structure 232 and/or the electrical machine 226. The thermal transport fluid absorbs heat from the electrical machine 226, which can control the temperature of the electrical machine during use. The heated thermal transport fluid may then return via a heated portion 242 and then through the heated fluid passageway 222 for delivering the heated thermal transport fluid to another system, such as the fuel delivery system 114 of FIG. 3, where the waste heat can be used to transfer heat to another system.

Figure 10:
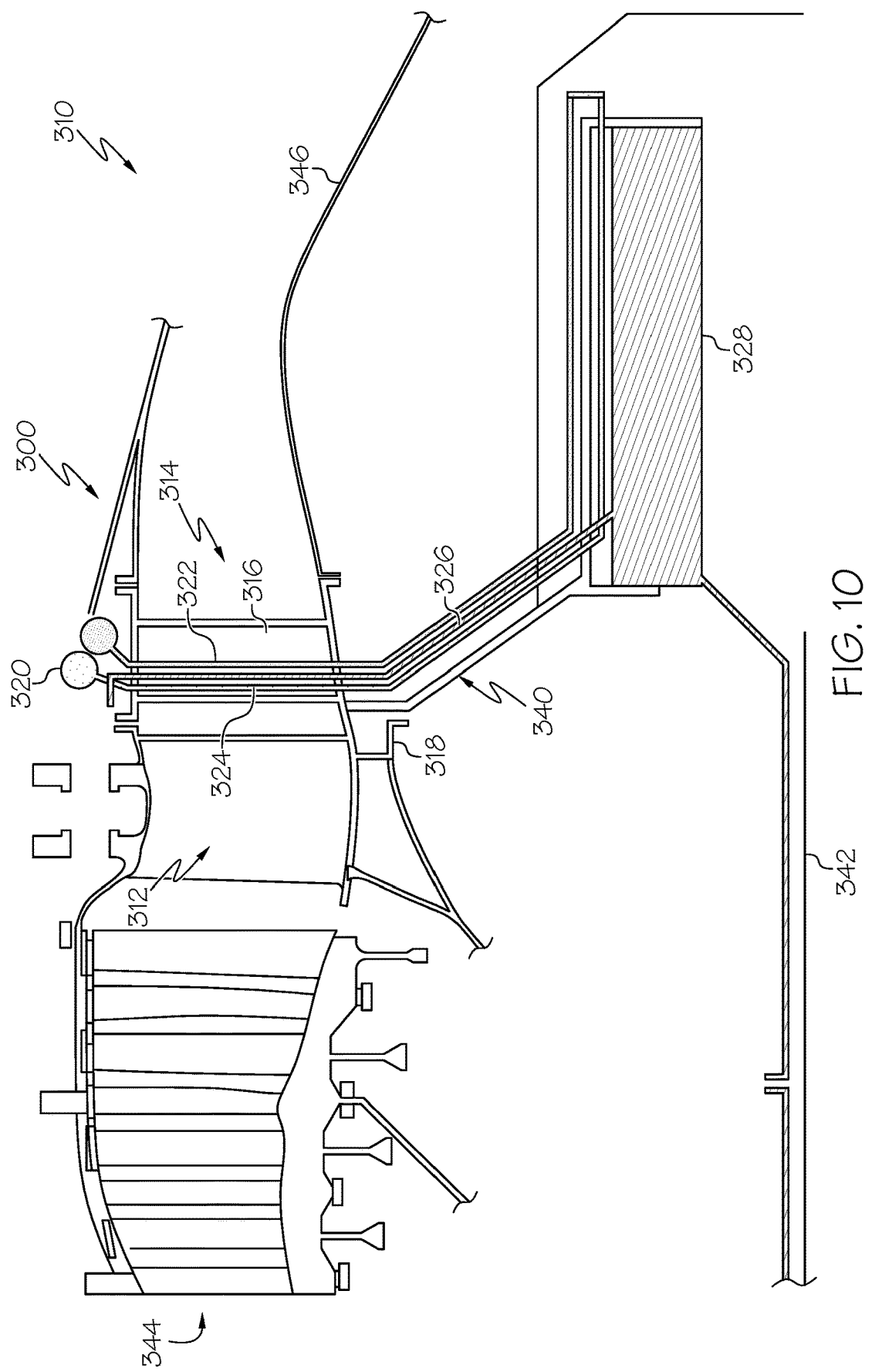
FIG. 10 is a schematic section view of another embodiment of a gas turbine engine, according to one or more embodiments shown and described herein.

Referring to FIG. 10, another embodiment of a heat recovery system 300 may be incorporated into a gas turbine engine 310 that is similar to the gas turbine engine 210 of FIG. 9. The gas turbine engine 310 includes a turbine rear frame 312 and an outlet guide vane assembly 314 that includes a plurality of outlet guide vanes 316. The outlet guide vane assembly 314 may again be releasably coupled to the turbine rear frame 312 using a rear flange coupling 318, or the outlet guide vane assembly 314 may be coupled directly to the turbine rear frame 312 and be a structural, load bearing part of the turbine rear frame 312.

As above, a thermal transport bus 320 includes a thermal transport fluid that is configured to flow therethrough. The outlet guide vanes 316 include either a heated fluid passageway 322 or a cold fluid passageway 324 that are fluidly connected to the thermal transport bus 320 such that the thermal transport fluid flows therethrough.

In this embodiment, generator services 326 extend through passageways in the outlet guide vanes 316. For example, the generator services 326 may extend through insulated passages in the outlet guide vanes 316 that are different from the heated and cold fluid passageways 322 and 324. The thermal transport bus 320 and the generator services 326 extend radially toward an electrical machine 328. A support structure 340 connects the electrical machine 328 to both the turbine rear frame 312 and an LP shaft 342. The generator services 326 and the thermal transport bus 320 may be mounted to the support structure 340. Electrical connections of the generator services 326 back to engine systems may be made outside of core airflow path 344 (e.g., in an outer cowl compartment) or connections can be made in tail cone 346, below the outlet guide vanes 316.

Figure 11:
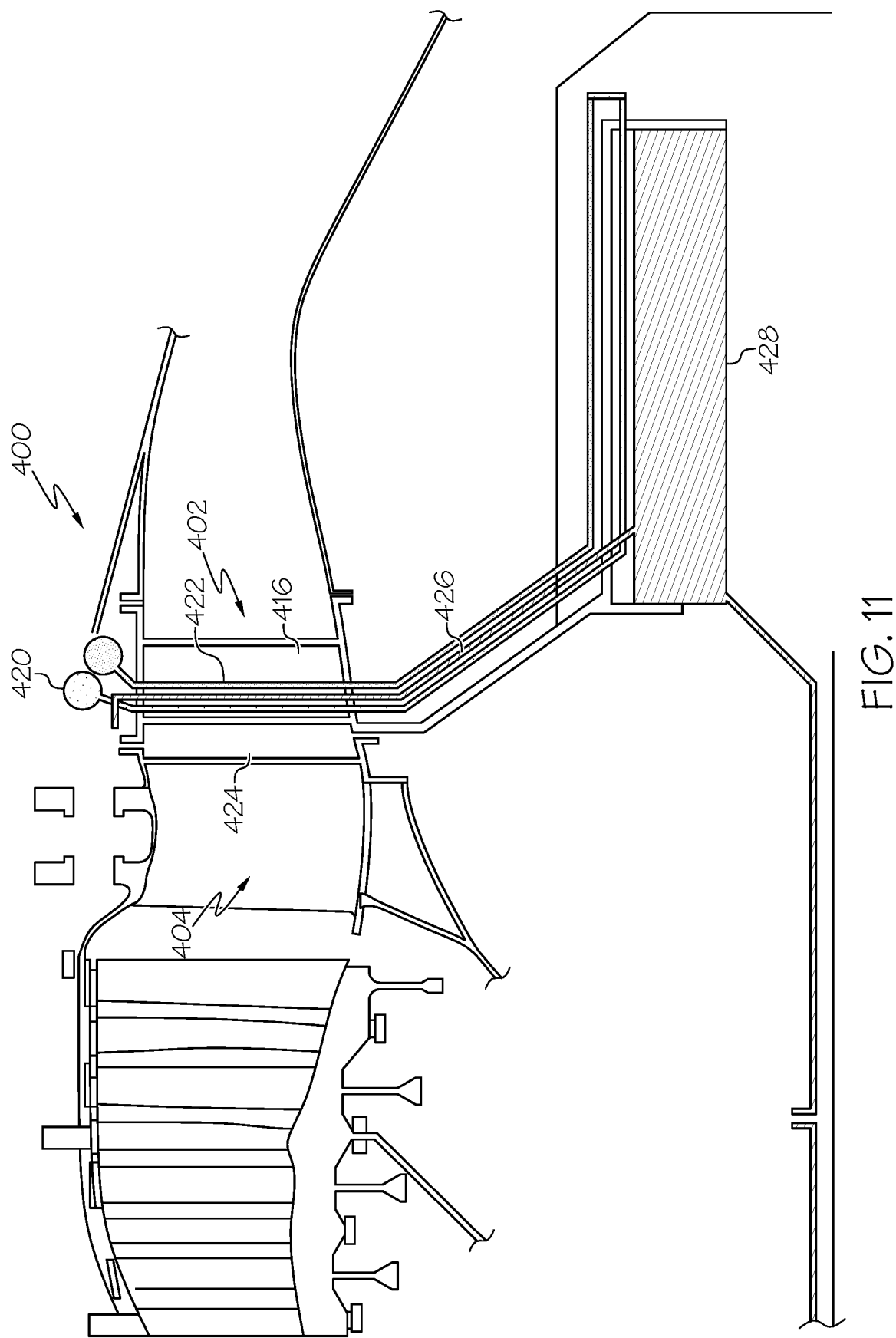
FIG. 11 is a schematic section view of another embodiment of a gas turbine engine, according to one or more embodiments shown and described herein.

FIG. 11 illustrates an embodiment of a heat recovery system 400 that is similar to the heat recovery system 300 of FIG. 10. In this embodiment, an outlet guide vane assembly 402 is a structural component that is bolted directly to a turbine rear frame 404 without a rear flange coupling. As above, a thermal transport bus 420 includes a thermal transport fluid that is configured to flow therethrough. Outlet guide vanes 416 include a heated fluid passageway 422 or a cold fluid passageway 424 and generator services 426 extend through passageways in the outlet guide vanes 416. Electrical machine 428 may be accessible through an access panel or the tail cone 430 along with the electrical machine 428 may be removed as a unit.

Figure 12:
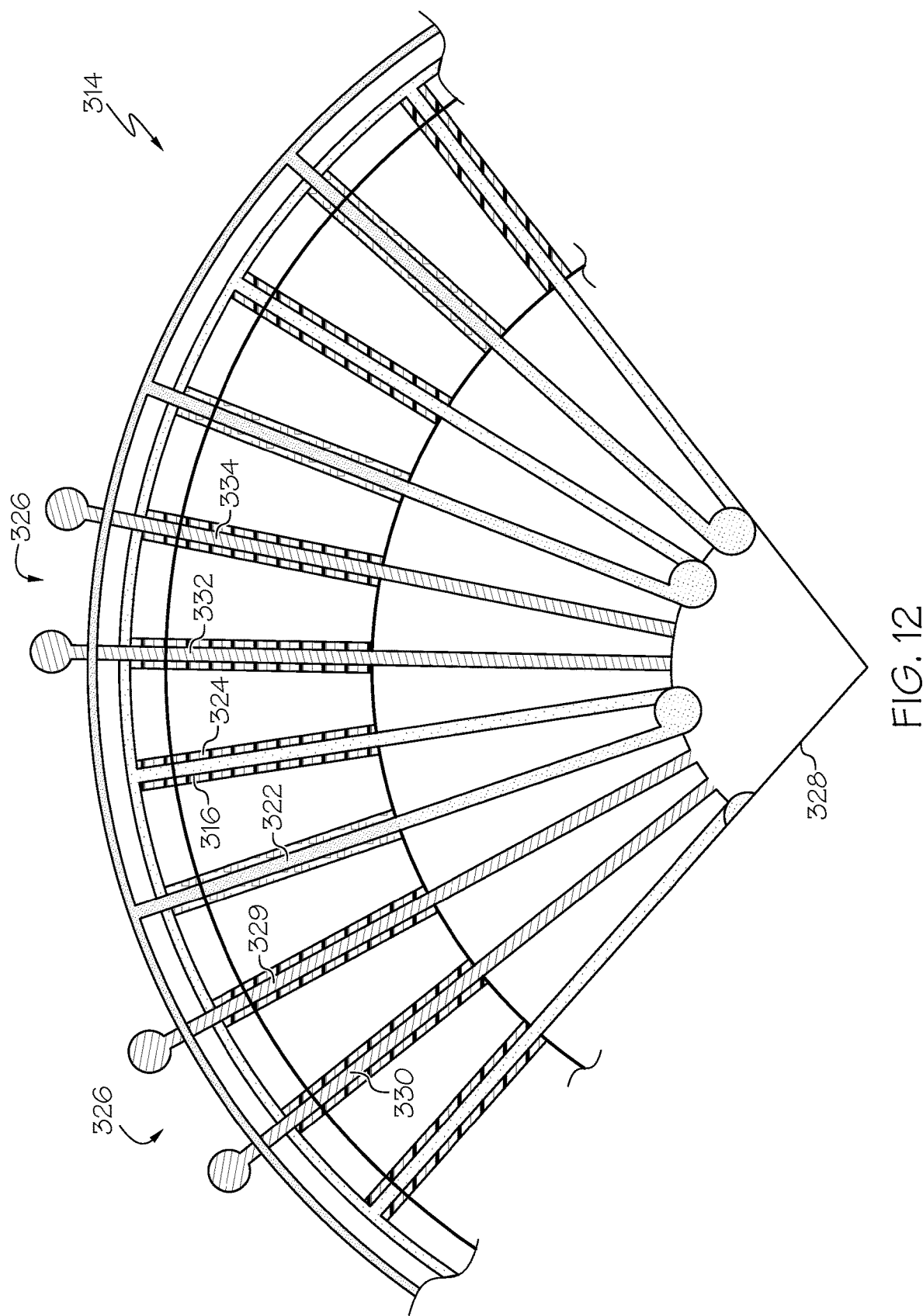
FIG. 12 is a schematic section view of the outlet guide vane assembly of FIG. 10, according to one or more embodiments shown and described herein.

FIG. 12 diagrammatically illustrates the outlet guide vane assembly 314 that may or may not be part of the turbine rear frame 312. The outlet guide vane assembly 314 includes the plurality of the outlet guide vanes 316 that are spaced-apart from one another in the circumferential direction within the core airflow path. Each outlet guide vane 316 of at least a plurality of the outlet guide vanes 316 includes either the heated fuel passageway 322 or a cold fluid passageway 324. The generator services 326 may include generator oil supply and return fluid passageways 329 and 330 and electric connector passageway 332 and 334. In some embodiments, the passageways 324, 329, 330, 332 and 334 may be insulated while the heated fluid passageway 322 may be formed of a thermally conducting material. The cold fluid passageways 324 lead to the electrical machine 328 to provide a cooling jacket 433, while the heated fluid passageways 322 direct the heated fluid away from the electrical machine 328.

Figure 13:
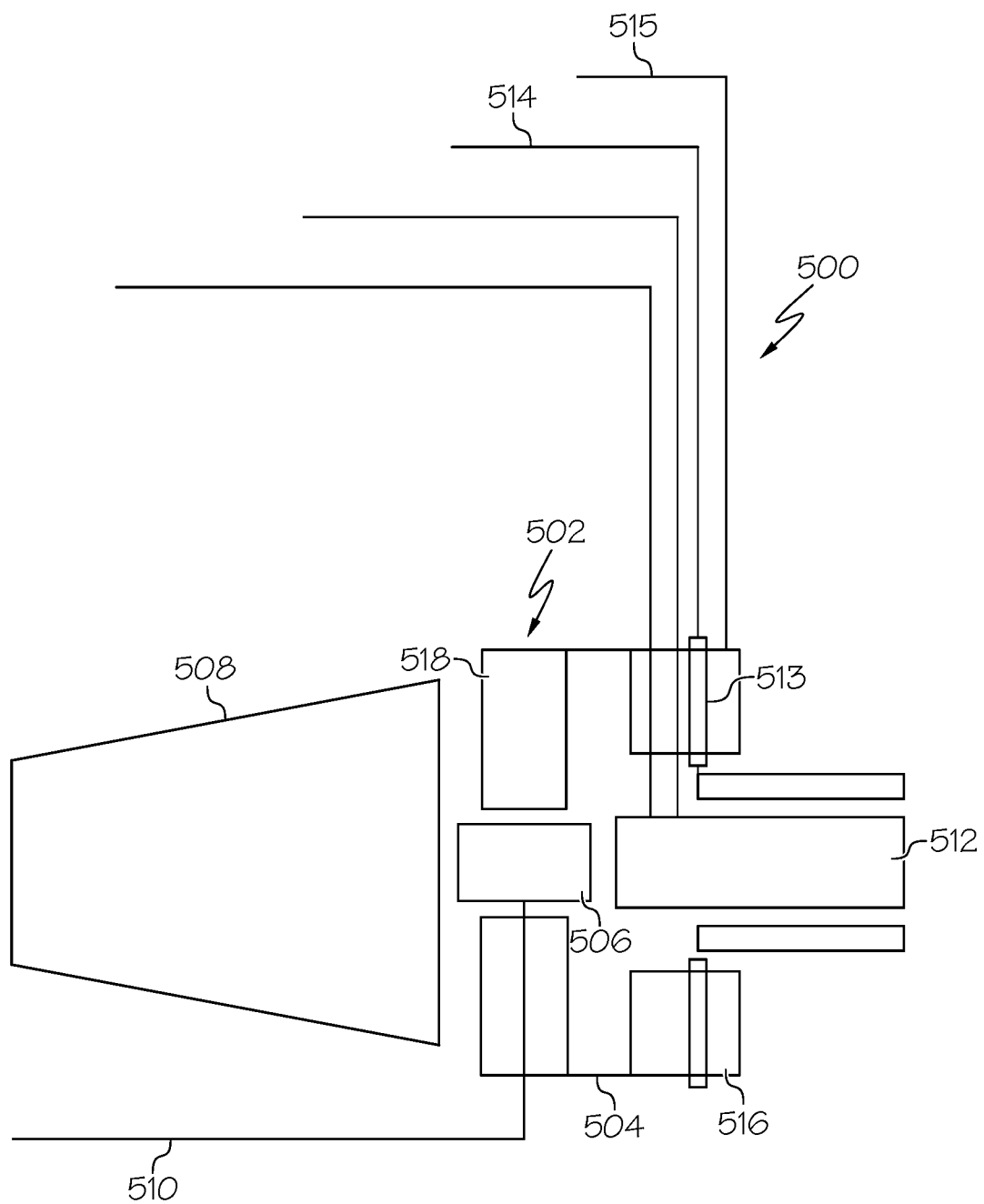
FIG. 13 is a diagrammatic view of an outlet guide vane assembly connected to a turbine rear frame, according to one or more embodiments shown and described herein.

Referring now to FIG. 13, an embodiment of an outlet guide vane assembly 500 is illustrated diagrammatically. The outlet guide vane assembly 500 is releasably mounted to a turbine rear frame 502 at mounts 504. A bearing assembly 506 may be provided that allows for rotation of turbine 508, LP shaft 510 and electrical machine 512 relative to the turbine rear frame 502. Cold and heated fluid passageways 514 and 515 extend through outlet guide vanes 516 of the outlet guide vane assembly 502 to take away heat from the electrical machine 512. The cold fluid passageway 514 may be provided with insulation 513 of the outlet guide vane 516 to bring cool fluid to the electrical machine 512, then the heated fluid returns through heated fluid passageway 515, which may be uninsulated to facilitate heat transfer to the fluid.

In some embodiments, the turbine rear frame 502 may also include outlet guide vanes 518 that may be turning or non-turning. Further, the outlet guide vanes 516 of the outlet guide vane assembly may be either turning or non-turning, as described above. The size and shape of the outlet guide vanes 516, 518 of the outlet guide vane assembly 500 and the turbine rear frame 502 may be selected to cooperate to change a flow angle of the heated air as the air passes by the outlet guide vanes 516, 518.

Figure 14:
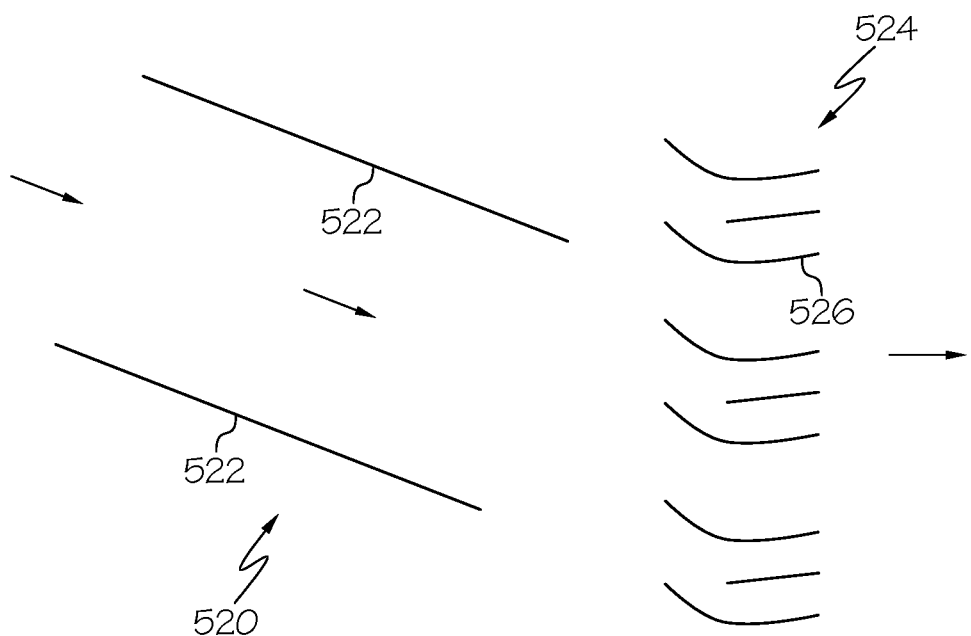
FIG. 14 is a diagrammatic view of an outlet guide vane assembly connected to a turbine rear frame, according to one or more embodiments shown and described herein.

Referring now to FIGS. 14-17, a number of turbine rear frame and outlet guide vane assemblies are illustrated. It should be noted that the shape and scale of the guide vane assemblies described herein are not to scale and are representative of a general shape of the guide vane assemblies. The turning guide vanes may have, for example, a leading edge that is less than 30 degrees relative to the airflow direction exiting the turbine section and a trailing edge that is less than five degrees relative to the airflow direction. Various shapes, sizes and turning angles may be used depending on the particular engine architecture. Referring first to FIG. 14, a non or low-turning turbine rear frame 520 includes outlet guide vanes 522. The outlet guide vanes 522 are low or non-turning in that they are arranged at about the same angle as the airflow exiting the turbine section. The outlet guide vanes 522 direct the heated air toward a turning outlet guide vane assembly 524 that is located downstream of the outlet guide vanes 522 of the turbine rear frame 520.

The outlet guide vane assembly 524 includes outlet guide vanes 526 that are arranged at an angle to the airflow exiting the turbine section to change or turn the direction of airflow. The outlet guide vanes 526 of the outlet guide vane assembly 524 may include heated and cold fluid passages, as discussed above.

Figure 15:
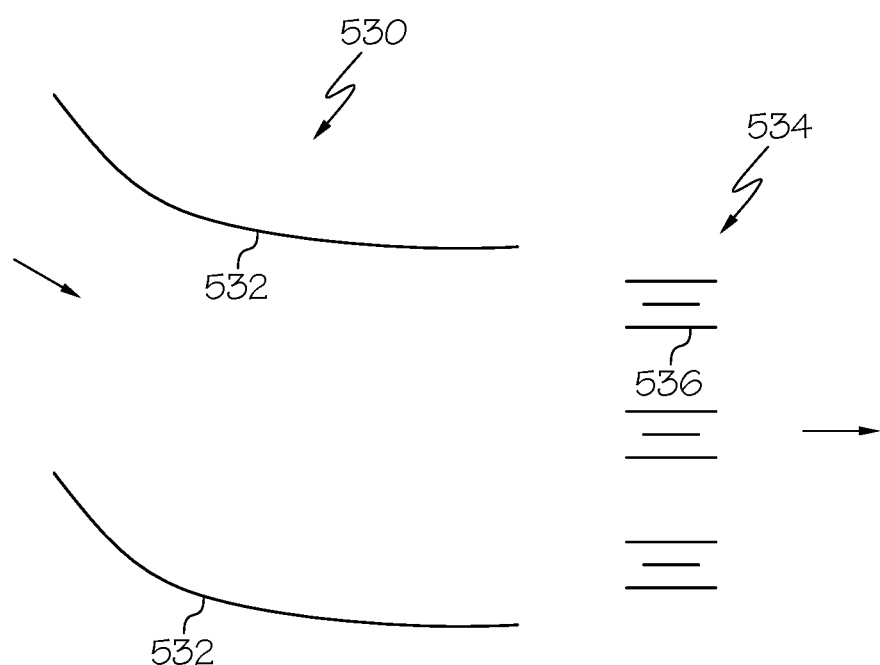
FIG. 15 is a diagrammatic view of an outlet guide vane assembly connected to a turbine rear frame, according to one or more embodiments shown and described herein.

Referring to FIG. 15, a turning turbine rear frame 530 includes outlet guide vanes 532. The outlet guide vanes 532 direct the heated air toward a low or non-turning outlet guide vane assembly 534 that is located downstream of the outlet guide vanes 532 of the turbine rear frame 530. The outlet guide vane assembly 534 includes outlet guide vanes 536 that are arranged at an angle that is about the same as the airflow exiting the turbine rear frame 530. The outlet guide vanes 536 of the outlet guide vane assembly 534 may include heated and cold fluid passages, as discussed above.

Figure 16:
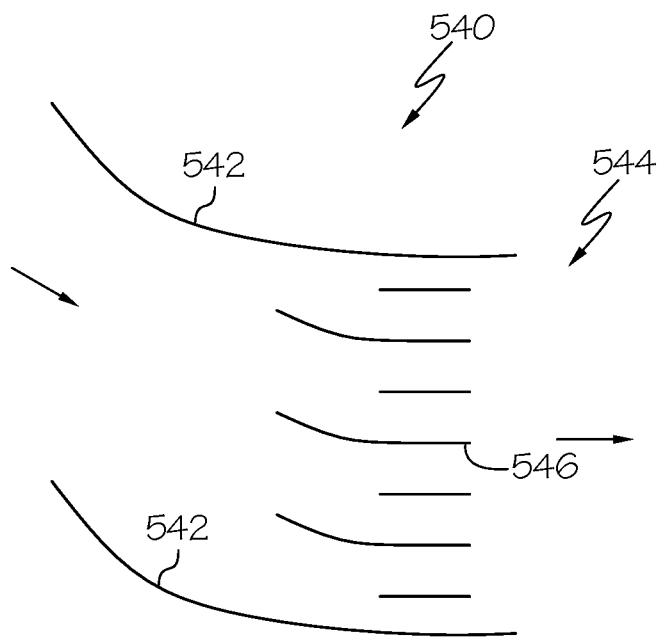
FIG. 16 is a diagrammatic view of an outlet guide vane assembly connected to a turbine rear frame, according to one or more embodiments shown and described herein.

Referring to FIG. 16, a turning turbine rear frame 540 includes outlet guide vanes 542. The outlet guide vanes 542 direct the heated air toward a low or non-turning outlet guide vane assembly 544 that is located between the outlet guide vanes 542 and inside of the turbine rear frame 540. The outlet guide vane assembly 544 includes outlet guide vanes 546 that are arranged at an angle that is about the same as the airflow exiting the turbine rear frame 540. The outlet guide vanes 546 of the outlet guide vane assembly 544 may include heated and cold fluid passages, as discussed above.

Figure 17:
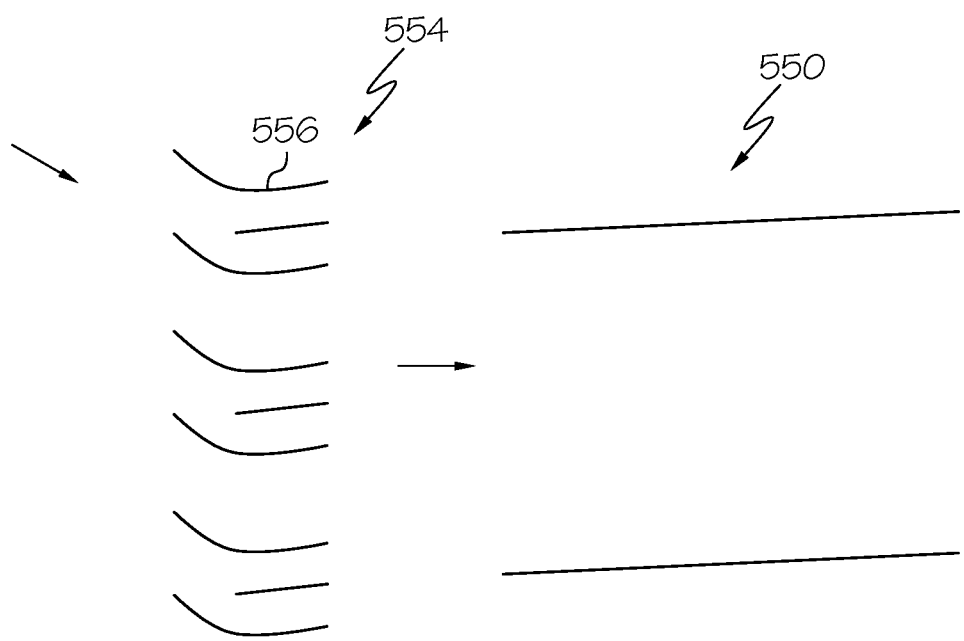
FIG. 17 is a diagrammatic view of an outlet guide vane assembly connected to a turbine rear frame, according to one or more embodiments shown and described herein.

Referring to FIG. 17, a turning outlet guide vane assembly 554 includes outlet guide vanes 556. The outlet guide vanes 556 direct the heated air toward a low or non-turning turbine rear frame 550 that is located downstream of the outlet guide vanes 556 of the outlet guide vane assembly 554. The outlet guide vanes 556 of the outlet guide vane assembly 54 may include heated and cold fluid passages, as discussed above.

Figure 18:
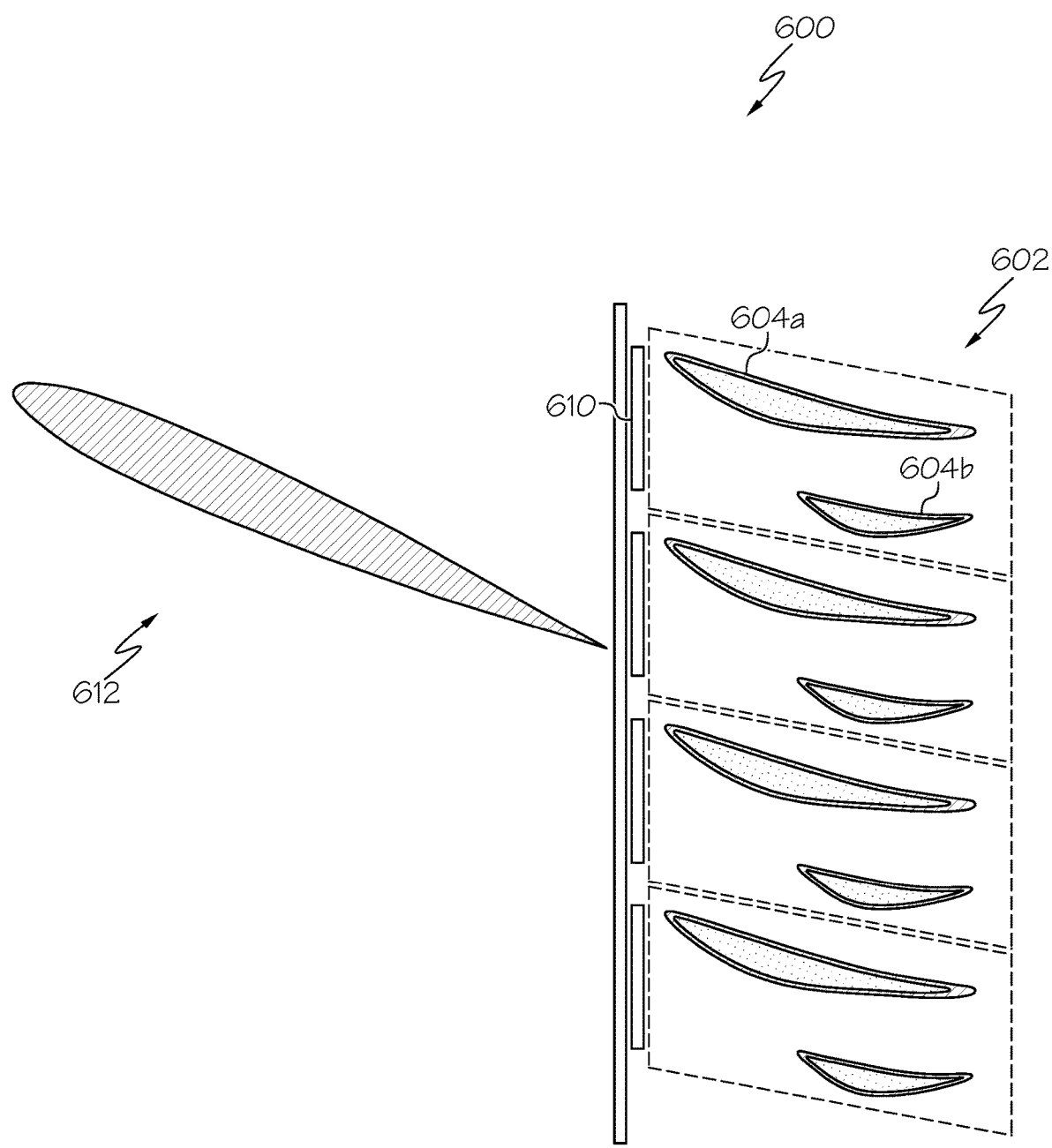
FIG. 18 is a diagrammatic view of an outlet guide vane assembly connected to a turbine rear frame, according to one or more embodiments shown and described herein.

Referring to FIG. 18 (which is a same general turning/non-turning arrangement of FIG. 14), in some embodiments, an outlet guide vane assembly 600 may be assembled with multiple packages of individual or multiple vane modules 602. In some embodiments, the multiple vane modules 602 may include multiple vane sets for a reduced integration complexity and reduced number of modular sets. The vane modules 602 may each include multiple outlet guide vanes 604a, 604b that include heated and cold fluid passages 606 and 608. The vane modules 602 are assembled to form the 360 degree outlet guide vane assembly 600. Each vane module 602 can include quick disconnect links (represented by lines 610) into a thermal transport bus and can be individually removable, e.g., for repair or replacement. In some embodiments, the outlet guide vane assembly 600 may be pre-assembled and then mounted to turbine rear frame 612 forming a turbine rear frame and heat exchanger assembly 614. The entire outlet guide assembly 600 may be flightline replaceable as a unit.

Figure 19:
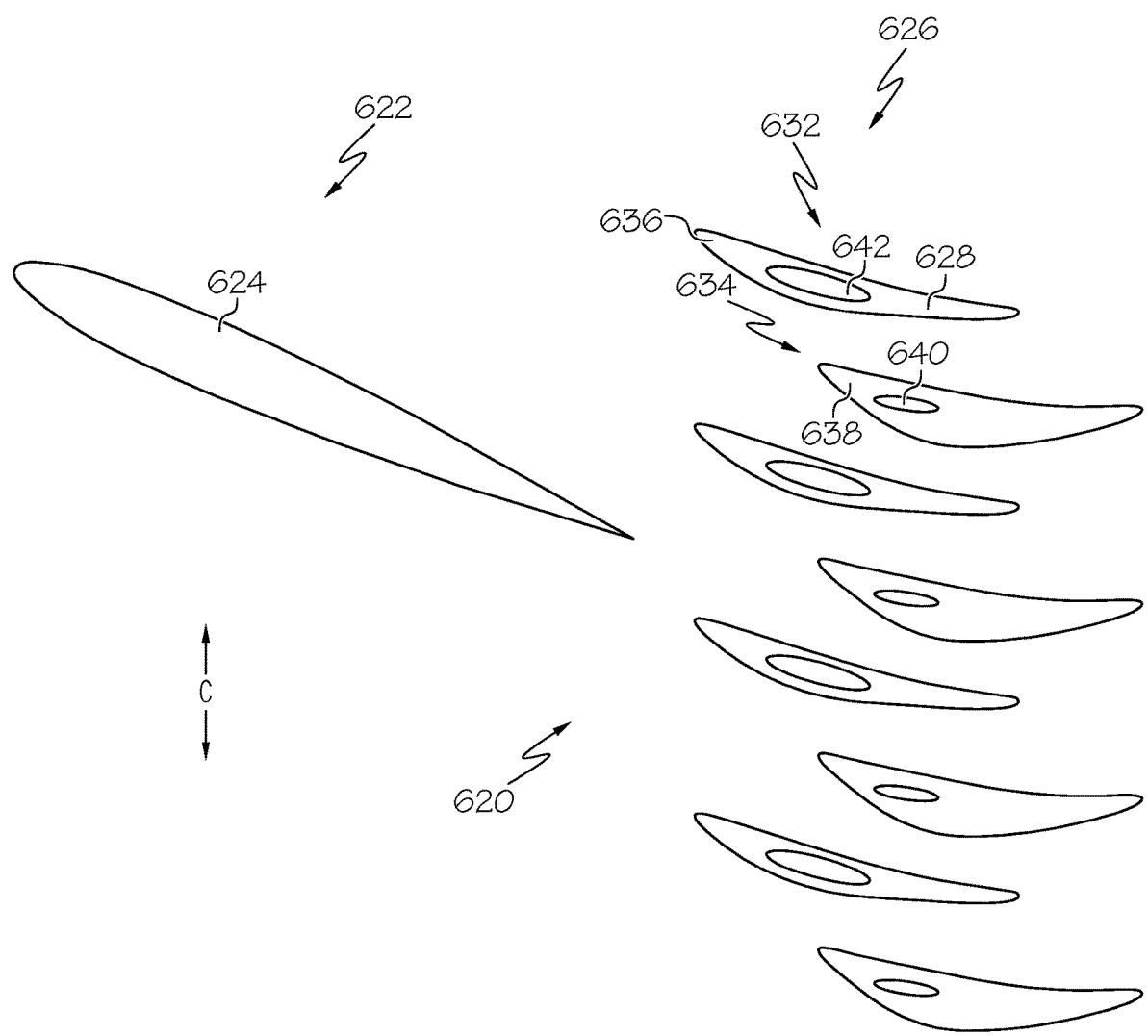
FIG. 19 is a diagrammatic view of an outlet guide vane assembly connected to a turbine rear frame, according to one or more embodiments shown and described herein.

Referring to FIG. 19, another embodiment of a turbine rear frame and heat exchanger assembly 620 includes a turbine rear frame 622 including outlet guide vanes 624 and outlet guide vane assembly 626 including outlet guide vanes 628. The outlet guide vanes 624 of the turbine rear frame 622 may be non or low-turning while the outlet guide vanes 628 may be turning such that the outlet guide vanes 624 and 628 function in tandem to change airflow direction. In contrast to the embodiment of FIG. 18, the outlet guide vanes 628 of the outlet guide vane assembly 626 are all of substantially a same length in the axial direction. The outlet guide vanes 628 are arranged in two staggered rows 632 and 634 such that outlet guide vanes 628 of row 632 have leading edges 636 that are aligned in the circumferential C direction in front of leading edges 638 of the outlet guide vanes 628 of row 634 that are also aligned in the circumferential direction C. As above, the guide vanes 628 include heated and cold fluid passages 640 and 642. The increased lengths of the outlet guide vanes 628 can further enhance airflow control. In combination with FIG. 7 and FIG. 18, any arrangement of same/different length guide vanes and offset/aligned leading edges may be used.

Figure 20:
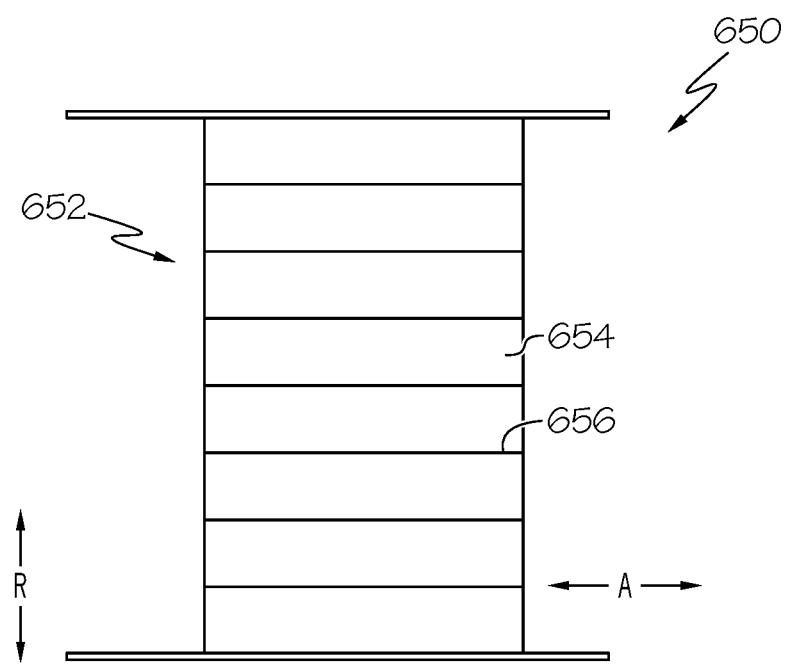
FIG. 20 is a diagrammatic side view of an outlet guide vane that includes surface enhancement features, according to one or more embodiments shown and described herein.
Figure 21:
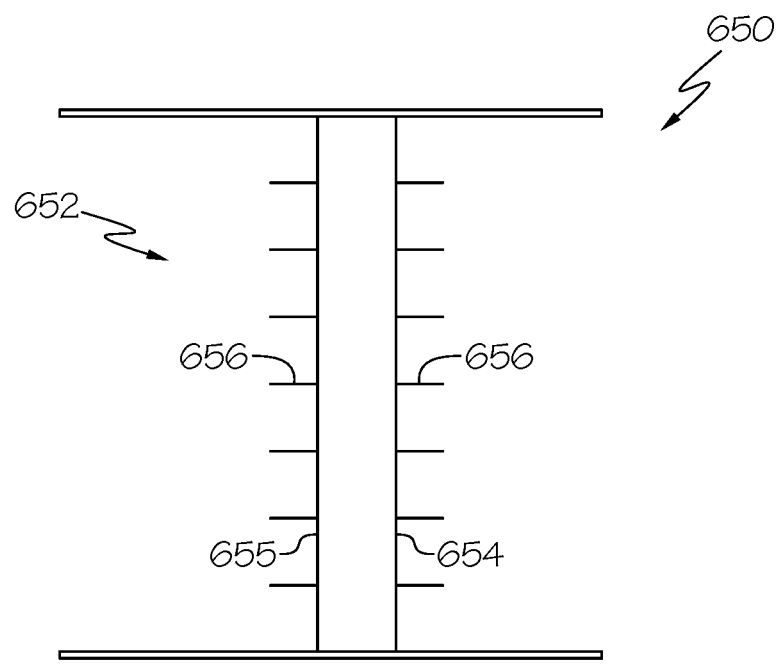
FIG. 21 is a diagrammatic end view of the outlet guide vane of FIG. 20, according to one or more embodiments shown and described herein.

Referring now to FIGS. 20 and 21, various surface enhancement features, such as fins, dimples and ribs, may be provided on surfaces of the outlet guide vanes to provide even more airflow and heat transfer capabilities. The surface enhancement features may be provided on surfaces of any of the outlet guide vanes described herein. FIGS. 20 and 21 illustrate a cross-sectional, partial view of an outlet guide vane assembly 650 that includes outlet guide vanes 652 that include side surfaces 654 and 655 including fins 656 that are located between outer and inner guide vane supports 658 and 660. The fins 656 may have a length that is substantially the same as a length of the outlet guide vanes 652. In other embodiments, the fins 656 may have lengths that are less than the length of the outlet guide vanes 652. The fins 656 extend generally in the axial direction A, but may have other orientations, as described below. An array of fins 656 is illustrated and the fins 656 are spaced-apart in the radial direction R along a height of the outlet guide vanes 652.

Fins may refer to structures that generally increase surface area of the side surfaces of the outlet guide vanes for increased heat transfer. Ribs may refer to shorter and/or thicker surface enhancement features that may be used to increase heat transfer more by inducing turbulent flow across the outlet guide vanes. Dimples may refer to recesses into the side surfaces that may be used to increase heat transfer more by inducing turbulent flow across the outlet guide vanes. Introducing turbulent flow can encourage mixing of layers of air, which can improve heat transfer. These surface enhancement features all increase surface area against which the air flows.

Figure 22:
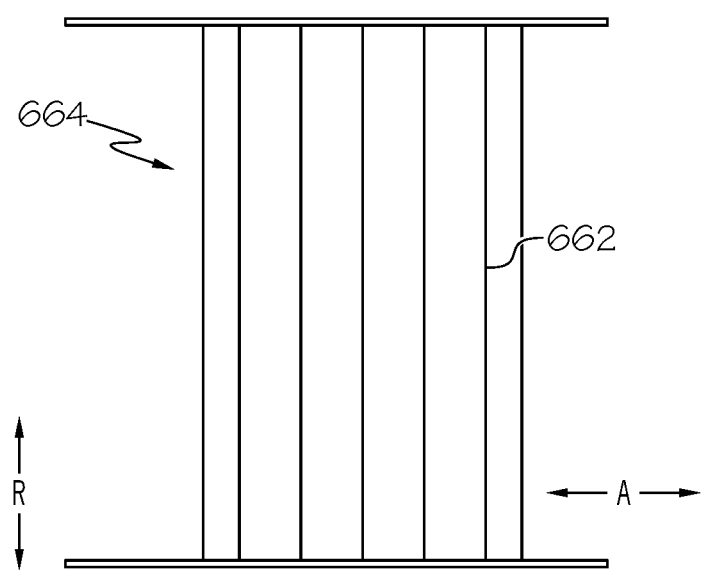
FIG. 22 is a diagrammatic side view of an outlet guide vane that includes surface enhancement features, according to one or more embodiments shown and described herein.
Figure 23:
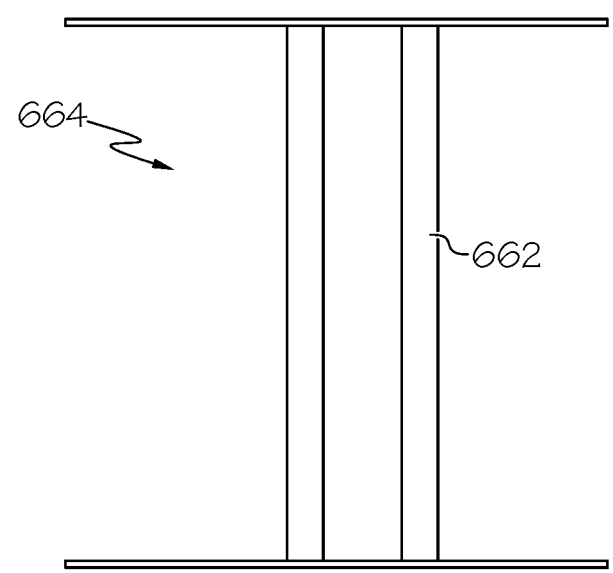
FIG. 23 is a diagrammatic end view of the outlet guide vane of FIG. 22, according to one or more embodiments shown and described herein.

FIGS. 22-32 illustrate additional surface area enhancement features of the outlet guide vanes described herein. Referring first to FIGS. 22 and 23, ribs 662 are illustrated that extend along heights of outlet guide vanes 664 in the radial direction R. The ribs 662 may have a height in the radial direction R that is substantially the same as a height of the outlet guide vanes 664. In other embodiments, the ribs 662 may have heights that are less than the heights of the outlet guide vanes 664. The ribs 662 extend generally in the radial direction R. An array of ribs 662 is illustrated and the ribs 662 are spaced-apart in the axial direction A along a length of the outlet guide vanes 664.

Figure 24:
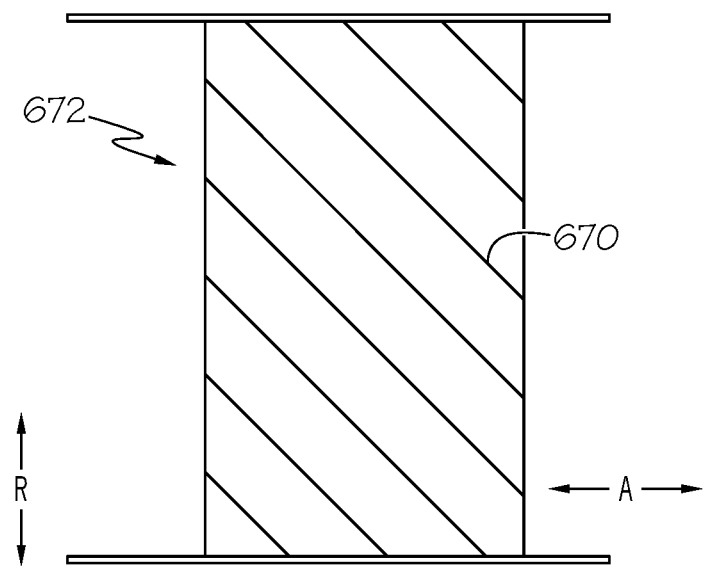
FIG. 24 is a diagrammatic side view of an outlet guide vane that includes surface enhancement features, according to one or more embodiments shown and described herein.
Figure 25:
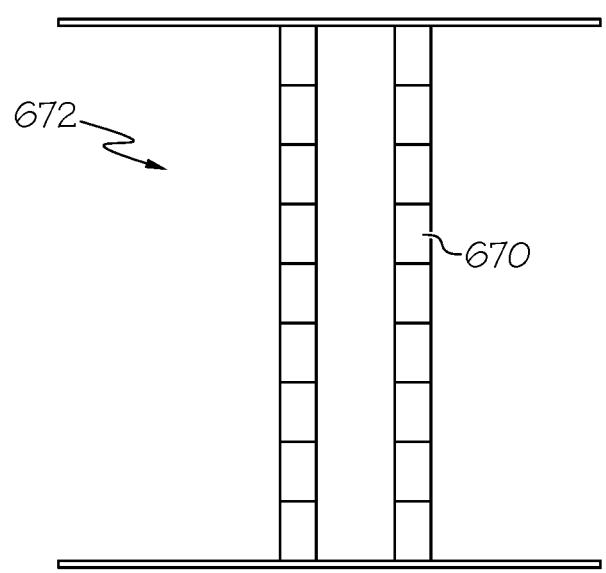
FIG. 25 is a diagrammatic end view of the outlet guide vane of FIG. 24, according to one or more embodiments shown and described herein.

Referring to FIGS. 24 and 25, as another example, ribs 670 are illustrated that extend along both the heights and the lengths of outlet guide vanes 672 in both axial and radial directions A and R. An array of ribs 670 is illustrated and the ribs 670 are spaced-apart in both the axial and radial directions A and R. The ribs 670 may be inclined to the axial direction at any suitable angle, such as 30 degrees, 45 degrees, 60 degrees, between zero and 90 degrees, between 20 and 60 degrees, etc.

Figure 26:
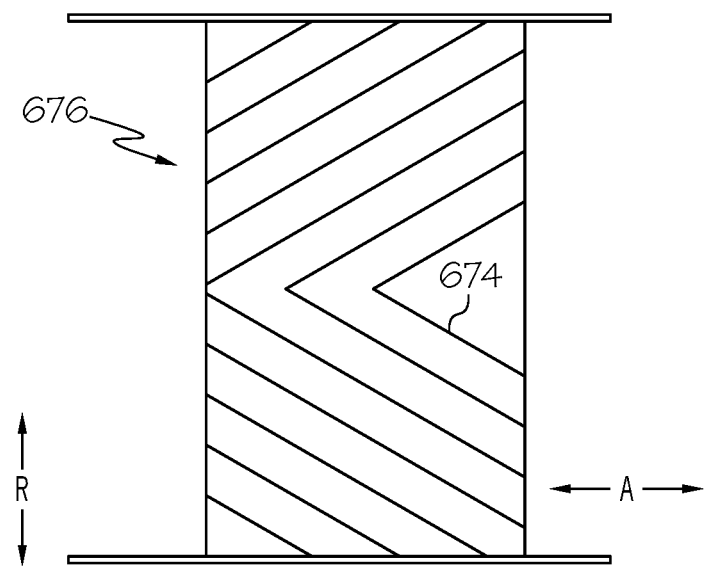
FIG. 26 is a diagrammatic side view of an outlet guide vane that includes surface enhancement features, according to one or more embodiments shown and described herein.
Figure 27:
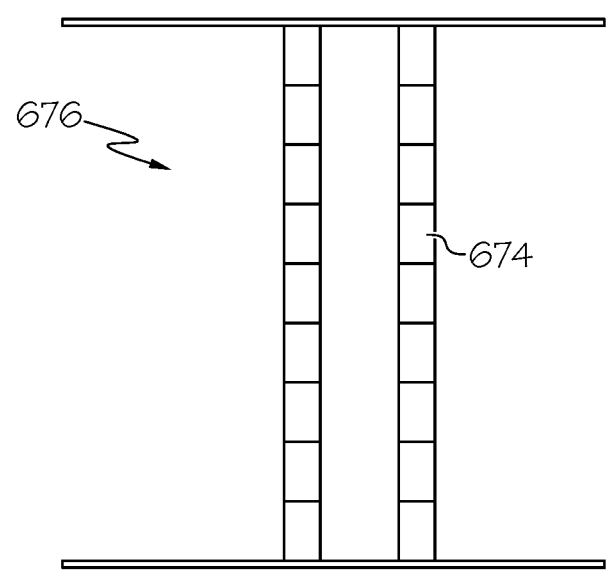
FIG. 27 is a diagrammatic end view of the outlet guide vane of FIG. 26, according to one or more embodiments shown and described herein.
Figure 28A:
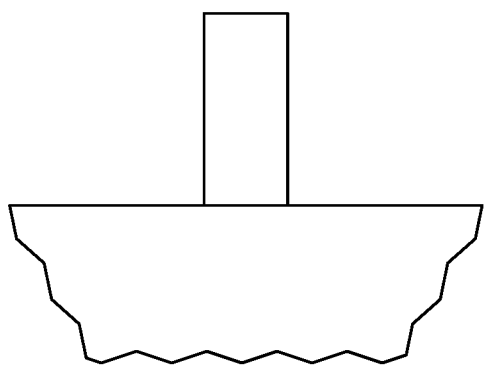
FIG. 28A is a diagrammatic end view of a surface enhancement feature, according to one or more embodiments shown and described herein.
Figure 28B:
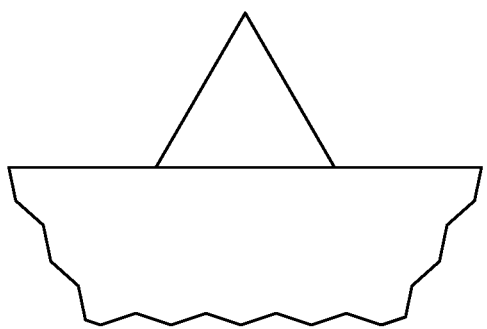
FIG. 28B is a diagrammatic end view of another surface enhancement feature, according to one or more embodiments shown and described herein.
Figure 28C:
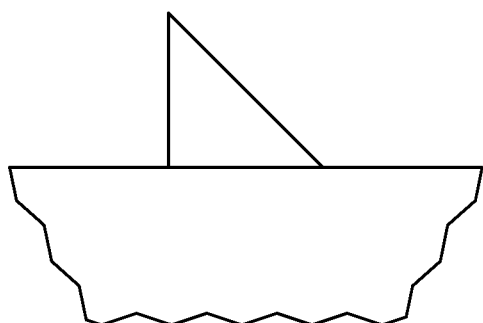
FIG. 28C is a diagrammatic end view of another surface enhancement feature, according to one or more embodiments shown and described herein.
Figure 28D:
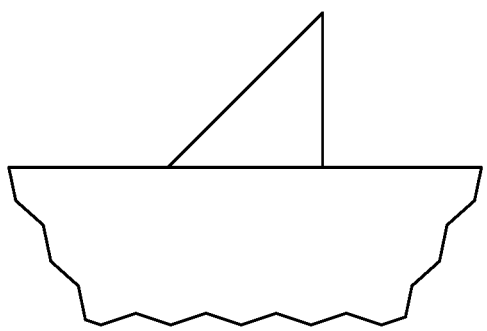
FIG. 28D is a diagrammatic end view of another surface enhancement feature, according to one or more embodiments shown and described herein.

Referring to FIGS. 26 and 27, ribs 674 are illustrated that extend along both the heights and the lengths of outlet guide vanes 676 in both axial and radial directions A and R. In this embodiments, the ribs 674 are arranged in a V-shaped pattern. An array of ribs 674 is illustrated and the ribs 670 are spaced-apart in both the axial and radial directions A and R. The ribs 674 may be inclined to the axial direction at any suitable angle, such as 30 degrees, 45 degrees, 60 degrees, between zero and 90 degrees, between 20 and 60 degrees, etc.

Figure 29:
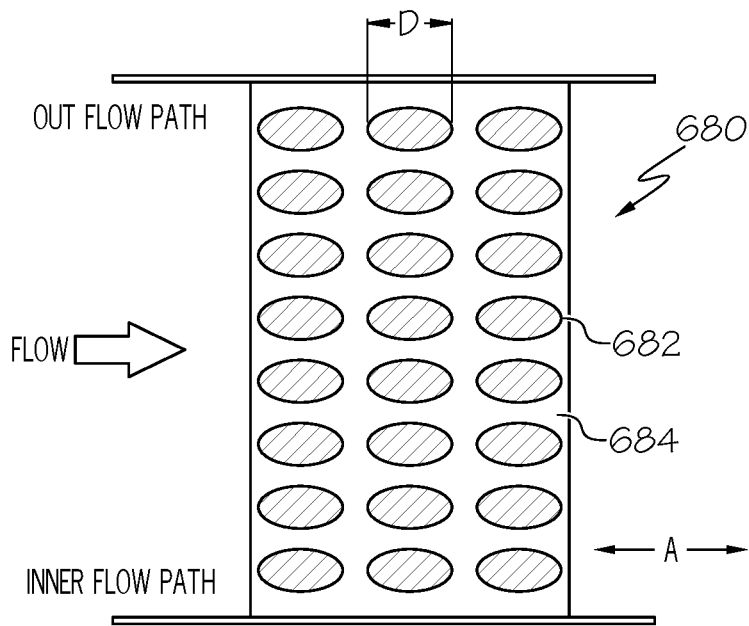
FIG. 29 is a diagrammatic side view of an outlet guide vane that includes surface enhancement features, according to one or more embodiments shown and described herein.

FIGS. 28A-28D illustrate fins and ribs of various cross-sectional shapes. Suitable shapes include rectangles, triangles, etc. Other suitable shapes may be used, such as wavy shapes or irregular shapes. In some embodiments, the surface enhancement features may formed as a monolithic part and of the same material as the outlet guide vanes. For example, additive manufacturing may be used to form the surface enhancement Fins and ribs may be surface enhancement features that project outward from the surfaces of the outlet guide vanes. Surfaces of the outlet guide vanes may be provided with surface enhancement features that project inward from the surfaces, such as dimples. Referring to FIG. 29, an outlet guide vane 680 includes dimples 682 that are arranged over at least one surface 684 of the outlet guide vanes 680. The dimples 682 are formed as recesses in the surface 684 and are also provided to generate more turbulent flow to increase heat transfer.

Figure 30:
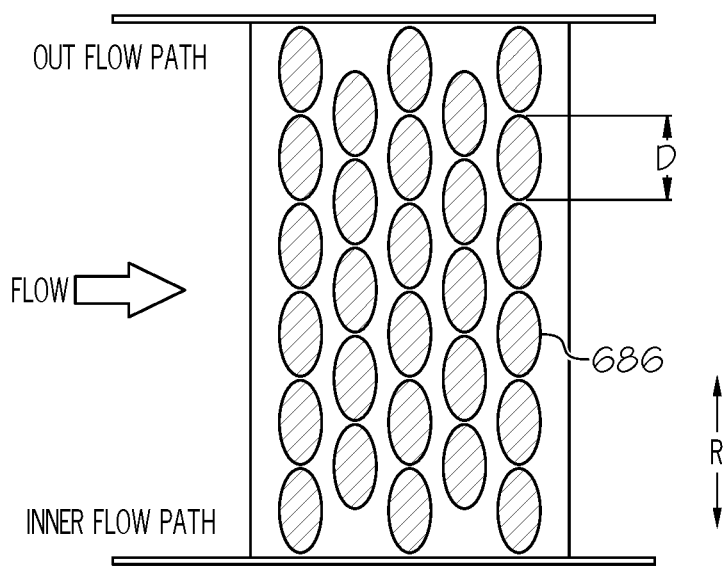
FIG. 30 is a diagrammatic side view of an outlet guide vane that includes surface enhancement features, according to one or more embodiments shown and described herein.
Figure 31:
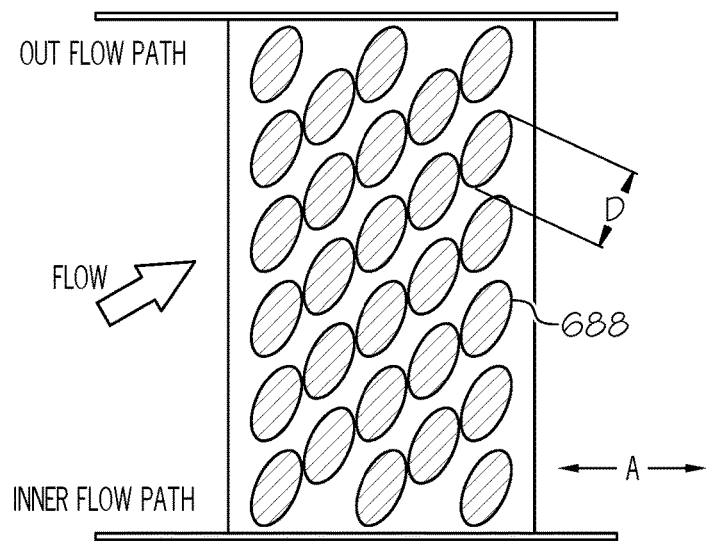
FIG. 31 is a diagrammatic side view of an outlet guide vane that includes surface enhancement features, according to one or more embodiments shown and described herein.

The dimples 682 may be any suitable shape, such as round, ovular, rectangular, etc. In the illustrated example, the dimples 682 are oval having an elongated, round shape. In FIG. 29, the elongated direction D of the dimples 682 extends in the axial direction A. In FIG. 30, the elongated direction D of dimples 686 is aligned with the radial direction R. In FIG. 31, the elongated direction D of dimples 688 is inclined to the axial direction A, such as 30 degrees, 45 degrees, 60 degrees, between 40 and 60 degrees, etc. Other configurations are possible, such as a V-shaped elongated direction arrangement.

Figure 32:
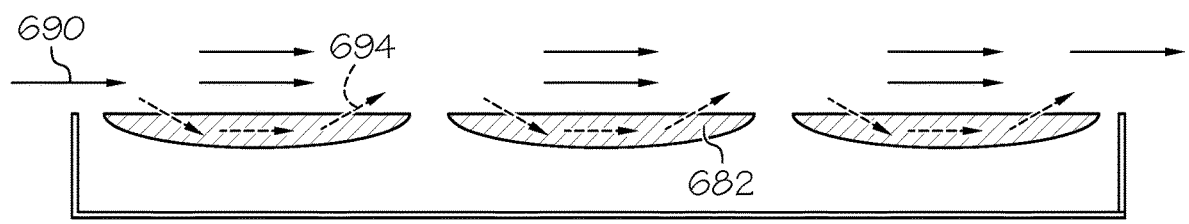
FIG. 32 is a diagrammatic side section view illustrating surface enhancement features in operation, according to one or more embodiments shown and described herein.

Referring to FIG. 32, operation of the dimples 682 is illustrated diagrammatically. As represented by arrow 690, airflow without influence of the dimples 682 tends to be relatively laminar Represented by arrow 692, air entering the dimples 682 tends to introduce more turbulent flow there air of the various layers tend to mix.

Figure 33:
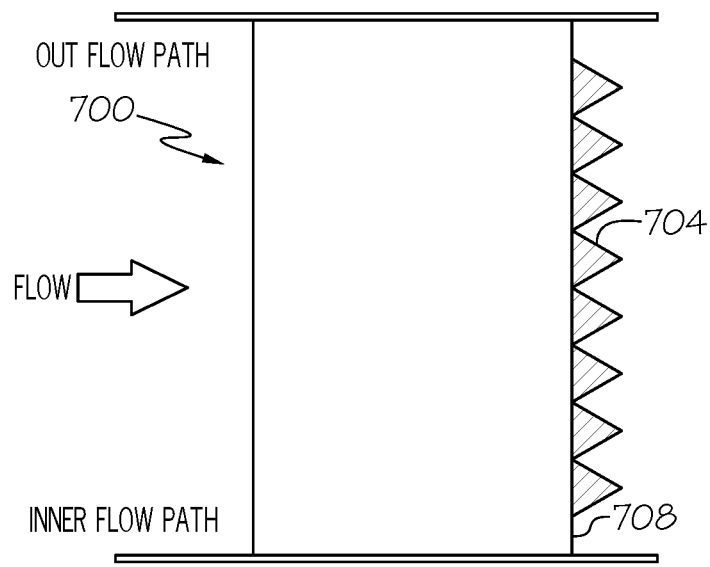
FIG. 33 is a diagrammatic side view of an outlet guide vane that includes surface enhancement features, according to one or more embodiments shown and described herein.
Figure 34:
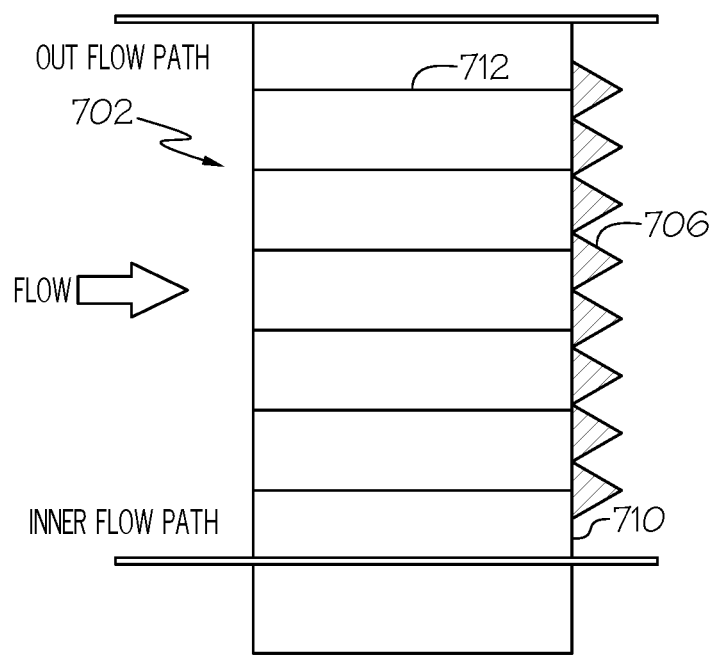
FIG. 34 is a diagrammatic side view of an outlet guide vane that includes surface enhancement features, according to one or more embodiments shown and described herein.

Referring to FIGS. 33 and 34, in some embodiments, outlet guide vanes 700 and 702 may be provided with surface enhancement features 704 and 706 that alters a trailing edge 708 and 710 geometry of the outlet guide vanes 700 and 702. For example, the surface enhancement features may include fins 704 and 706 that are provided at the trailing edges 708 and 710. The fins 704 and 706 may be provided with (FIG. 34) or without (FIG. 33) the surface enhancement features discussed above, such as fins 712, ribs and/or dimples. The surface enhancement features 704 and 706 may be used for noise augmentation to alter a sound profile of the exhaust stream.

Figure 35:
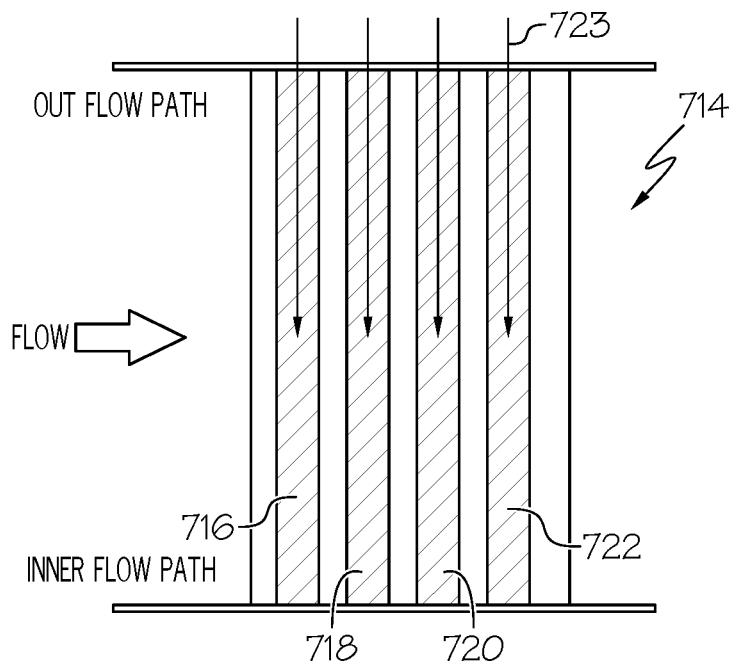
FIG. 35 is a diagrammatic side view of an outlet guide vane that includes multiple fluid passageways, according to one or more embodiments shown and described herein.
Figure 36:
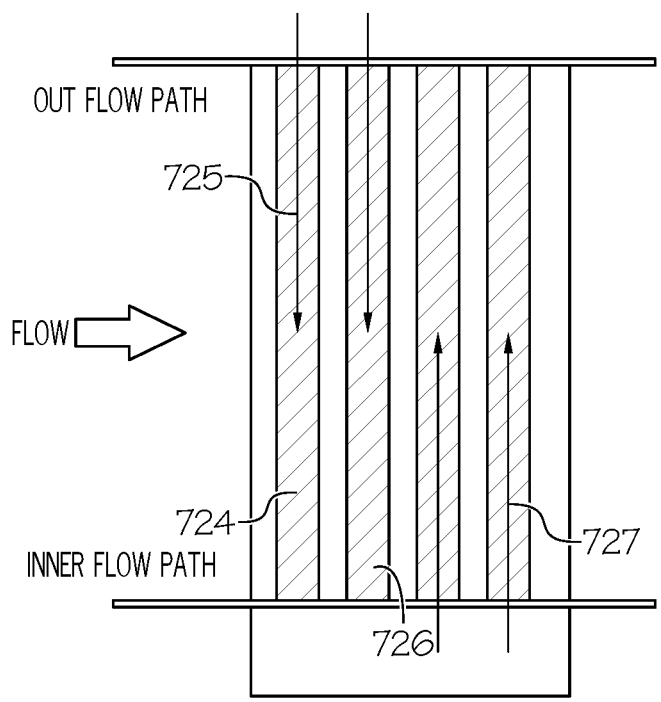
FIG. 36 is a diagrammatic side view of an outlet guide vane that includes multiple fluid passageways, according to one or more embodiments shown and described herein.
Figure 37:
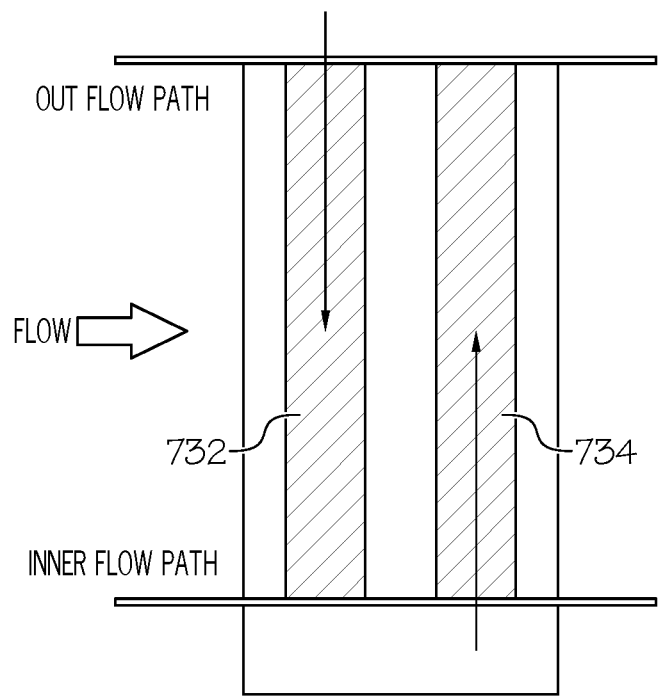
FIG. 37 is a diagrammatic side view of an outlet guide vane that includes multiple fluid passageways, according to one or more embodiments shown and described herein.
Figure 38:
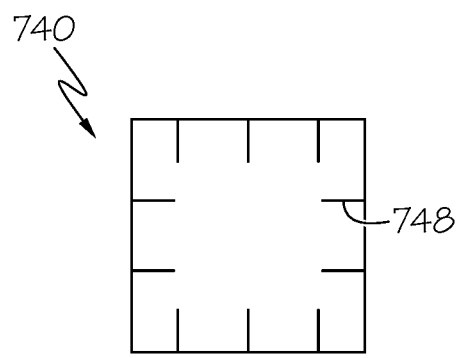
FIG. 38 is a diagrammatic end view of a fluid passageway of an outlet guide vane, according to one or more embodiments shown and described herein.
Figure 39:
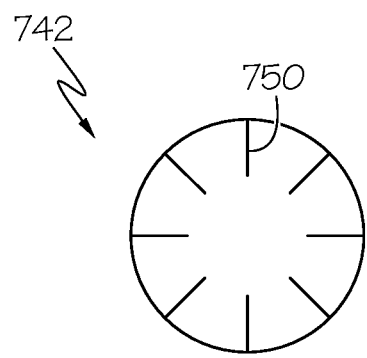
FIG. 39 is a diagrammatic end view of a fluid passageway of an outlet guide vane, according to one or more embodiments shown and described herein.
Figure 40:
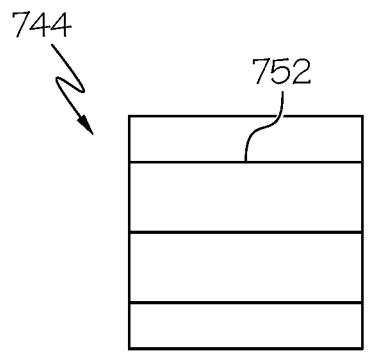
FIG. 40 is a diagrammatic end view of a fluid passageway of an outlet guide vane, according to one or more embodiments shown and described herein.
Figure 41:
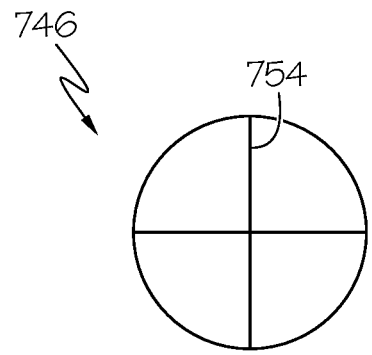
FIG. 41 is a diagrammatic end view of a fluid passageway of an outlet guide vane, according to one or more embodiments shown and described herein.

Referring to FIGS. 35-37, various fluid passage configurations may be formed depending on the desired fluid flow characteristics. For example, referring to FIG. 35, an outlet guide vane 714 may be provided with multiple fluid passages 716, 718, 720 and 722. In this example, the fluid passages 716, 718, 720 and 722 direct fluid all in the same direction as indicated by arrows 723. In FIG. 36, fluid passages 724 and 726 direct fluid radially inward as indicated by arrows 725, while fluid passages 728 and 730 direct fluid radially outward as indicated by arrows 727. Fewer or more fluid passages may be provided, such as shown by FIG. 37 that includes two fluid passageways 732 and 734, one passageway 732 directing fluid radially inward and the other passageway 734 directing fluid radially outward.

Figure 42:
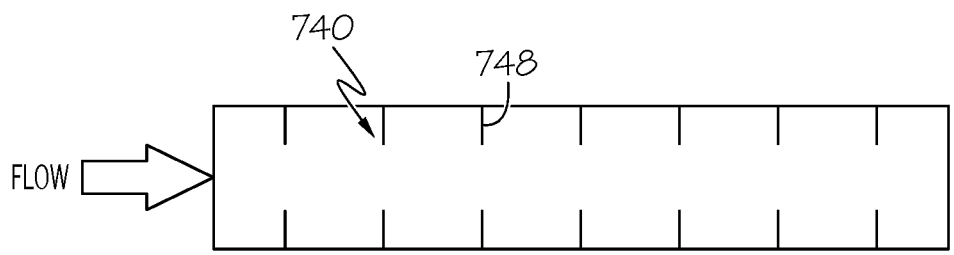
FIG. 42 is a diagrammatic section view of a fluid passageway of an outlet guide vane, according to one or more embodiments shown and described herein.
Figure 43:
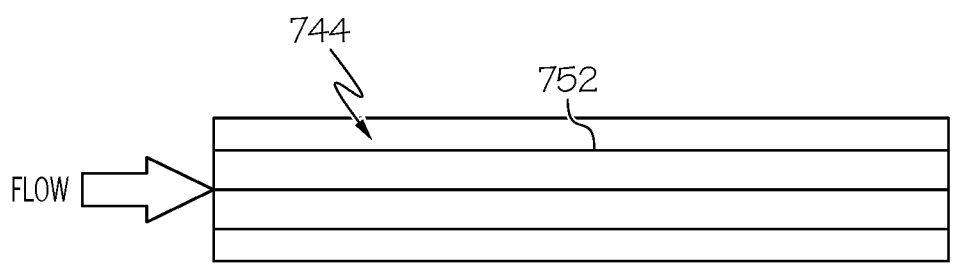
FIG. 43 is a diagrammatic section view of a fluid passageway of an outlet guide vane, according to one or more embodiments shown and described herein.

Referring now to FIGS. 38-41, fluid passages 740, 742, 744 and 746 may be provided with surface enhancement features 748, 750, 752 and 754, such as fins, dimples, ribs, dividers, etc. As can be seen, the passages 740, 742, 744 and 746 themselves may be a predetermined cross-sectional shape, such as round or rectangular. Referring to FIGS. 42 and 43, the surface enhancement features 748, 750, 752 and 754 may be provided a pre-selected intervals (FIG. 42) or the entire length of the passageway 740, 742, 744 and 746 (FIG. 43).

Figure 44:
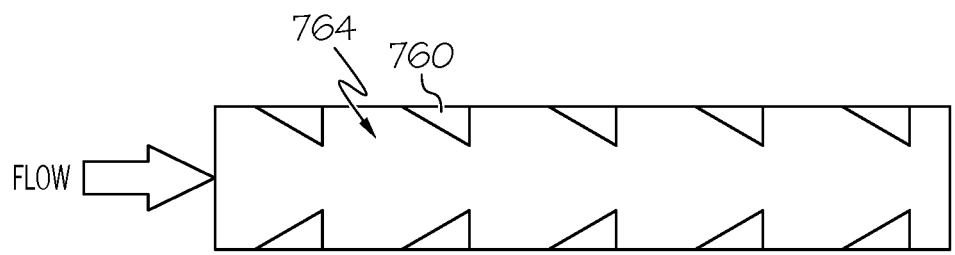
FIG. 44 is a diagrammatic section view of a fluid passageway of an outlet guide vane, according to one or more embodiments shown and described herein.
Figure 45:
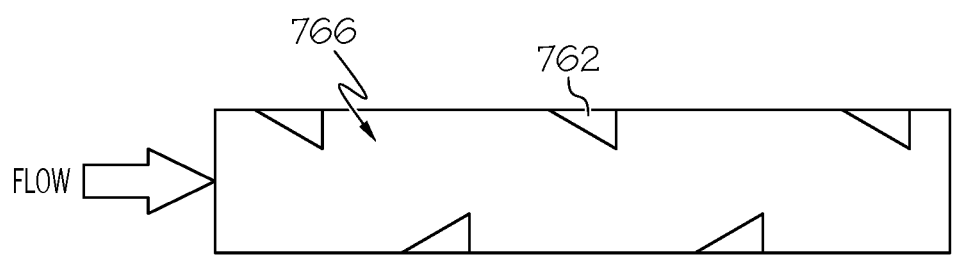
FIG. 45 is a diagrammatic section view of a fluid passageway of an outlet guide vane, according to one or more embodiments shown and described herein.
Figure 46:
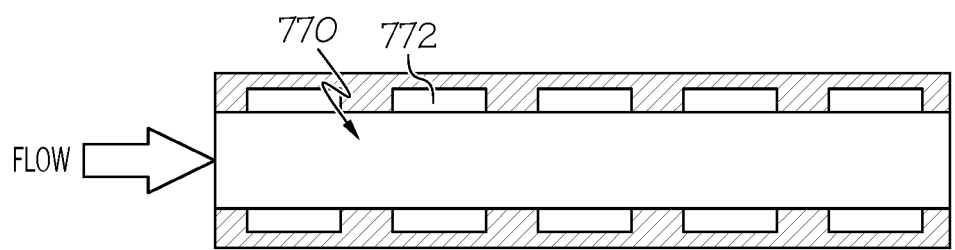
FIG. 46 is a diagrammatic section view of a fluid passageway of an outlet guide vane, according to one or more embodiments shown and described herein.

Referring to FIGS. 44 and 45, surface enhancement features 760 and 762 may act as turbulators to increase turbulence in fluid passages 764 and 766. The surface enhancement features 760 and 762 may extend entirely around the fluid passages 764 and 766 360 degrees or they may extend only partially around the fluid passages 764 and 766. In some embodiments, the surface enhancement features 762 may be staggered and alternate in a repeating fashion, such as shown by FIG. 45. FIG. 46 shows another embodiment that includes a fluid passage 770 that includes surface enhancement features 772 in the form of dimples. The dimples 772 can also be used to introduce turbulence in the fluid flow.

The above-described outlet guide vane assemblies provide an integrated heat exchanger structure that captures heat and can remove heat from the exhaust air stream and an electric machine. The waste heat can then be used to heat other systems, such a fuel of the fuel delivery system. The outlet guide vane assemblies can provide a line replaceable unit that enables dispatch reliability. The generator lubricant and electrical connectors can be segregated from the turbine rear frame which can isolate the system for repairability without disassembling the turbomachinery. Damaged vane modules can also be removed and replaced. Combining the generator cooling and waste heat removal into a single circuit can increase benefits of the thermal transport system. The outlet guide vanes of the outlet guide vane assembly can be used as turning elements behind a non-turning turbine rear frame, which can improve overall flowpath losses. The thermal transport fluid can be used to cool the generator using an independent pump after the engine is shut down, which can improve thermal soakback effects on the generator. The outlet guide vane assembly, or parts thereof, can be removed with the turbine rear frame attached to the turbine casing and engine bearings and sumps can be unaffected by the removal of the outlet guide vane assembly.

As used herein, the singular forms "a," "an" and "the" include plural referents unless the context clearly dictates otherwise. Thus, for example, reference to "a" component includes aspects having two or more such components, unless the context clearly indicates otherwise.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. The term "about" may include any values within ten percent of a particular value, such as within five percent of a particular value, such as within two percent of a particular value, such as within one percent of a particular value.

Directional terms as used herein—for example up, down, right, left, front, back, top, bottom, upper, lower,—are made only with reference to the figures as drawn and are not intended to imply absolute orientation unless otherwise expressly stated. The terms "axial" and "longitudinal" both refer to a direction that is parallel to a centerline the gas turbine engine, while "radial" refers to a direction perpendicular to the longitudinal direction. The terms "tangential" and "circumferential" refer to a direction mutually perpendicular to both the radial and longitudinal directions. The terms "forward" or "front" refer to a location upstream in airflow passing through or around a component during operation, and the terms "aft" or "rear" refer to a location downstream during operation. These directional terms are used merely for convenience in the description and also do not require a particular orientation of the structures described thereby.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

Further aspects are provided by the subject matter in the following clauses:

1. A gas turbine engine comprising: a fan located at a forward portion of the gas turbine engine; a compressor section and a turbine section arranged in serial flow order, the compressor section and the turbine section together defining a core airflow path; a rotary member rotatable with at least a portion of the compressor section and with at least a portion of the turbine section; and an outlet guide vane assembly comprising multiple outlet guide vanes located in an exhaust airflow path downstream of the turbine section, the multiple outlet guide vanes being spaced-apart circumferentially from each other over an angular range of about 360 degrees, and each multiple outlet guide vane defining a radial extent; wherein at least one of the multiple outlet guide vanes comprises a cold fluid passageway extending at least partially radially therethrough and another of the multiple guide vanes comprises a heated fluid passageway extending at least partially radially therethrough which the fluid coolant flows and receives heat from exhaust airflow from the core airflow path.

2. The gas turbine engine of any preceding clause, wherein the at least one of the multiple outlet guide vanes comprises multiple fluid passageways extending at least partially radially therethrough.

3. The gas turbine engine of any preceding clause further comprising a turbine rear frame that supports the turbine section, the turbine rear frame comprising the outlet guide vane assembly.

4. The gas turbine engine of any preceding clause further comprising a turbine rear frame that supports the turbine section, the outlet guide vane assembly connected to the turbine rear frame.

5. The gas turbine engine of any preceding clause, wherein the turbine rear frame comprises multiple outlet guide vanes located in the exhaust airflow path downstream of the turbine section that are spaced-apart circumferentially from each other about 360 degrees.

6. The gas turbine engine of any preceding clause, wherein the multiple outlet guide vanes of the turbine rear frame are low or non-turning and the multiple outlet guide vanes of the outlet guide vane assembly are turning.

7. The gas turbine engine of any preceding clause, wherein the multiple outlet guide vanes of the turbine rear frame are turning and the multiple outlet guide vanes of the outlet guide vane assembly are low or non-turning.

8. The gas turbine engine of any preceding clause further comprising an electrical machine coupled to the rotary member and located at least partially inward of the core airflow path in a radial direction.

9. The gas turbine engine of any preceding clause further comprising a thermal transport bus comprising a thermal transport fluid, the thermal transport bus providing the thermal transport fluid to the cold fluid passageway and the heated fluid passageway.

10. The gas turbine engine of any preceding clause, wherein the thermal transport bus extends from the cold fluid passageway and the heated fluid passageway to the electrical machine to carry heat away from the electrical machine during operation.

11. The gas turbine engine of any preceding clause, wherein the cold fluid passageway and the heated fluid passageway are connected to a fuel delivery system, wherein fuel is directed through the cold and heated fluid passageways.

12. The gas turbine engine of any preceding clause, wherein the outlet guide vane assembly comprises multiple vane modules that are assembled together, each vane module including at least one of the multiple outlet guide vanes of the outlet guide vane assembly.

13. The gas turbine engine of any preceding clause, wherein the multiple outlet guide vanes of the outlet guide vane assembly have different lengths.

14. The gas turbine engine of any preceding clause, wherein the multiple outlet guide vanes of the outlet guide vane assembly have substantially the same length.

15. The gas turbine engine of any preceding clause the at least one of the multiple outlet guide vanes comprises a surface enhancement feature that increases a surface area of a side surface of the outlet guide vane.

16. The gas turbine engine of any preceding clause, wherein the surface enhancement feature projects outwardly from the side surface.

17. The gas turbine engine of any preceding clause, wherein the surface enhancement feature is a recess in the side surface.

18. The gas turbine engine of any preceding clause, wherein one or both of the cold fluid passageway and the heated fluid passageway comprises a surface enhancement feature that extends into the one or both of the cold fluid passageway and the heated fluid passageway.

19. The gas turbine engine of any preceding clause, wherein the at least one of the multiple outlet guide vanes comprises a surface enhancement feature located at a trailing edge of the at least one of the multiple outlet guide vanes.

20. A method comprising: removably attaching an outlet guide vane assembly to a turbine rear frame of a gas turbine engine, the outlet guide vane assembly comprising: multiple outlet guide vanes located in an exhaust airflow path downstream of the turbine section, the multiple outlet guide vanes being spaced-apart circumferentially from each other over an angular range of about 360 degrees, and each multiple outlet guide vane defining a radial extent, wherein at least one of the multiple outlet guide vanes comprises a cold fluid passageway extending at least partially radially therethrough through which a fluid coolant flows and another of the multiple guide vanes comprises a heated fluid passageway extending at least partially radially therethrough through which the fluid coolant flows and receives heat from exhaust airflow from a core airflow path; and delivering the fluid coolant through the cold fluid passageway and then the heated fluid passageway, the fluid coolant receiving heat from exhaust airflow from the core airflow path as the fluid coolant is directed through the heated fluid passageway.
21. The method of any preceding clause further comprising a fuel delivery system delivering fuel to the cold fluid passageway and receiving fuel from the heated fluid passageway.
22. The method of any preceding clause further comprising a thermal transport bus delivering a thermal transport fluid to the cold fluid passageway and receiving thermal transport fluid from the heated fluid passageway.
23. The method of any preceding clause, wherein the gas turbine engine further comprises an electrical machine coupled to a rotary member and located at least partially inward of a core airflow path of the gas turbine engine in a radial direction, the method further comprising delivering the thermal transport fluid to the electrical machine thereby transferring heat from the electrical machine to the thermal transport fluid.
24. The method of any preceding clause further comprising assembling multiple vane modules together to form the outlet guide vane assembly, each vane module including at least one of the multiple outlet guide vanes of the outlet guide vane assembly.
25. The method of any preceding clause further comprising individually removing one or more of the multiple vane modules from the outlet guide vane assembly with the remaining multiple guide vane modules remaining connected to the turbine rear frame.
26. The method of any preceding clause further comprising replacing the one or more of the multiple vane modules with one or more different vane modules.
27. The method of any preceding clause, wherein the at least one of the multiple outlet guide vanes comprises a surface enhancement feature that increases a surface area of a side surface of the outlet guide vane.
28. The method of any preceding clause, wherein the surface enhancement feature projects outwardly from the side surface.
29. The method of any preceding clause, wherein the surface enhancement feature is a recess in the side surface.
30. A gas turbine engine comprising: a fan located at a forward portion of the gas turbine engine; a compressor section and a turbine section arranged in serial flow order, the compressor section and the turbine section together defining a core airflow path; a rotary member rotatable with at least a portion of the compressor section and with at least a portion of the turbine section; and an outlet guide vane assembly comprising multiple outlet guide vanes located in an exhaust airflow path downstream of the turbine section that are spaced-apart circumferentially from each other about 360 degrees; wherein one or more outlet guide vane comprises a surface enhancement feature that increases a surface area of a side surface of the outlet guide vane.
31. The gas turbine engine of any preceding clause, wherein the outlet guide vane comprises a cold fluid passageway extending radially therethrough.
32. The gas turbine engine of any preceding clause, wherein another of the multiple guide vanes comprises a heated fluid passageway extending radially therethrough in fluid communication with the cold fluid passageway.
33. The gas turbine engine of any preceding clause, wherein one or both of the cold fluid passageway and the heated fluid passageway comprises a surface enhancement feature that extends into the one or both of the cold fluid passageway and the heated fluid passageway.
34. The gas turbine engine of any preceding clause, wherein the surface enhancement feature projects outwardly from the side surface.
35. The gas turbine engine of any preceding clause, wherein the surface enhancement feature is a recess in the side surface.
36. The gas turbine engine of any preceding clause, wherein the outlet guide vane comprises multiple surface enhancement features.
37. The gas turbine engine of any preceding clause, wherein the multiple surface enhancement features are arranged in an array where adjacent surface enhancement features are spaced-apart.
38. A gas turbine engine comprising: a compressor section and a turbine section arranged in serial flow order, the compressor section and the turbine section together defining a core airflow path; a rotary member rotatable with at least a portion of the compressor section and with at least a portion of the turbine section; a turbine rear frame comprising first outlet guide vanes located in an exhaust airflow path downstream of the turbine section, the first outlet guide vanes being spaced-apart circumferentially from each other over an angular range of about 360 degrees, and each first outlet guide vane defining a radial extent; and an outlet guide vane assembly comprising second outlet guide vanes located in the exhaust airflow path adjacent the first outlet guide vanes, the second outlet guide vanes being spaced-apart circumferentially from each other over an angular range of about 360 degrees, and each second outlet guide vane defining a radial extent; wherein one or both of the first outlet guide vanes and the second outlet guide vanes is turning thereby altering a flow direction of exhaust airflow from the exhaust airflow path.
39. The gas turbine engine of any preceding clause, wherein the first outlet guide vanes are low or non-turning arranged at about a same angle as the exhaust airflow and the second outlet guide vanes are turning.
40. The gas turbine engine of any preceding clause, wherein the first outlet guide vanes are turning and the second outlet guide vanes are low or non-turning arranged at about a same angle as the exhaust airflow.
41. The gas turbine engine of any preceding clause, wherein both of the first outlet guide vanes and the second outlet guide vanes are turning.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A gas turbine engine comprising:
a compressor section and a turbine section arranged in serial flow order, the compressor section and the turbine section together defining a core airflow path;
a rotary member rotatable with at least a portion of the compressor section and with at least a portion of the turbine section;
a turbine rear frame comprising first outlet guide vanes located in an exhaust airflow path downstream of the turbine section, the first outlet guide vanes being spaced-apart circumferentially from each other over an angular range of about 360 degrees, and each first outlet guide vane defining a radial extent; and
an outlet guide vane assembly comprising second outlet guide vanes located in the exhaust airflow path adjacent and downstream to the first outlet guide vanes, the second outlet guide vanes being spaced-apart circumferentially from each other over an angular range of about 360 degrees, and each second outlet guide vane defining a radial extent;
wherein the second outlet guide vanes are turning thereby altering a flow direction of an exhaust airflow from the exhaust airflow path;
wherein at least one of the second outlet guide vanes comprises a cold fluid passageway extending at least partially radially therethrough and through which a fluid coolant flows and another of the second guide vanes comprises a heated fluid passageway extending at least partially radially therethrough and through which the fluid coolant flows in a return path.

2. The gas turbine engine of claim 1, wherein the first outlet guide vanes are non-turning arranged at about a same angle as the exhaust airflow.

3. The gas turbine engine of claim 1, wherein the first outlet guide vanes are turning.

4. The gas turbine engine of claim 1, wherein both of the first outlet guide vanes and the second outlet guide vanes are turning.

5. The gas turbine engine of claim 1, wherein the turbine rear frame supports the turbine section, the outlet guide vane assembly connected to the turbine rear frame.

6. The gas turbine engine of claim 1, wherein at least one of the second outlet guide vanes comprises the cold fluid passageway through which the fluid coolant flows away from a thermal transport bus connected to a source of the fluid coolant and another of the second guide vanes comprises the heated fluid passageway extending at least partially radially therethrough through which the fluid coolant flows and receives heat from the exhaust airflow from the core airflow path and returns to the thermal transport bus.

7. The gas turbine engine of claim 6, wherein the at least one of the second outlet guide vanes comprises multiple fluid passageways extending at least partially radially therethrough.

8. The gas turbine engine of claim 6 further comprising an electrical machine coupled to the rotary member and located at least partially inward of the core airflow path in a radial direction.

9. The gas turbine engine of claim 8, wherein the fluid coolant comprises a thermal transport fluid.

10. The gas turbine engine of claim 9, wherein the thermal transport bus extends from the cold fluid passageway and the heated fluid passageway to the electrical machine to carry heat away from the electrical machine during operation.

11. The gas turbine engine of claim 6, wherein the cold fluid passageway and the heated fluid passageway are connected to a fuel delivery system, wherein the fluid coolant comprises fuel that is directed through the cold and heated fluid passageways.

12. The gas turbine engine of claim 1, wherein the outlet guide vane assembly comprises multiple vane modules that are assembled together, each vane module including at least one of the second outlet guide vanes of the outlet guide vane assembly.

13. The gas turbine engine of claim 1, wherein the second outlet guide vanes of the outlet guide vane assembly have different lengths.

14. The gas turbine engine of claim 1, wherein the second outlet guide vanes of the outlet guide vane assembly have substantially the same length.

15. A method comprising:
removably attaching an outlet guide vane assembly downstream to a turbine rear frame of a gas turbine engine, the outlet guide vane assembly comprising:
multiple outlet guide vanes located in an exhaust airflow path downstream of a turbine section, the multiple outlet guide vanes being spaced-apart circumferentially from each other over an angular range of about 360 degrees, and each multiple outlet guide vane defining a radial extent;
wherein the multiple outlet guide vanes are turning thereby altering a flow direction of the exhaust airflow from the exhaust airflow path; and
changing the flow direction of the exhaust airflow from a first direction exiting the turbine rear frame using the multiple outlet guide vanes;
wherein at least one of the multiple outlet guide vanes comprises a cold fluid passageway extending at least partially radially therethrough and through which a fluid coolant flows and another of the multiple outlet guide vanes comprises a heated fluid passageway extending at least partially radially therethrough through which the fluid coolant flows in a return path.

16. The method of claim 15, wherein the multiple outlet guide vanes are first outlet guide vanes, the turbine rear frame comprising second outlet guide vanes spaced-apart circumferentially from each other over an angular range of about 360 degrees.

17. The method of claim 16, wherein the second outlet guide vanes are non-turning arranged at about a same angle as the exhaust airflow and the first outlet guide vanes are turning.

18. The method of claim 16, wherein both of the first outlet guide vanes and the second outlet guide vanes are turning.

* * * * *